United States Patent
Kim et al.

(10) Patent No.: US 10,305,311 B2
(45) Date of Patent: May 28, 2019

(54) ELECTRONIC DEVICE AND METHOD FOR CONTROLLING TEMPERATURE OF ELECTRONIC DEVICE

(71) Applicant: Samsung Electronics Co., Ltd., Gyeonggi-do (KR)

(72) Inventors: Joon-Il Kim, Seoul (KR); Won-Ki Lee, Gyeonggi-do (KR); Sang-Moo Hwangbo, Gyeonggi-do (KR); Se-Ho Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 286 days.

(21) Appl. No.: 15/242,777

(22) Filed: Aug. 22, 2016

(65) Prior Publication Data

US 2017/0063141 A1    Mar. 2, 2017

(30) Foreign Application Priority Data

Aug. 25, 2015 (KR) .......................... 10-2015-0119629

(51) Int. Cl.
*H02J 7/00* (2006.01)
*H02J 7/02* (2016.01)
*H02J 50/12* (2016.01)

(52) U.S. Cl.
CPC ............ *H02J 7/025* (2013.01); *H02J 7/0029* (2013.01); *H02J 7/0091* (2013.01); *H02J 50/12* (2016.02)

(58) Field of Classification Search
CPC ........ H02J 7/025; H01F 38/14; Y02T 90/122; B60L 11/182; Y02E 60/12
See application file for complete search history.

(56) References Cited

U.S. PATENT DOCUMENTS

| | | | |
|---|---|---|---|
| 2003/0038617 A1* | 2/2003 | Yaklin | G05F 3/24 323/304 |
| 2006/0082346 A1* | 4/2006 | Nagasawa | H02J 7/0029 320/150 |

(Continued)

FOREIGN PATENT DOCUMENTS

| | | |
|---|---|---|
| JP | 2010-239777 A | 10/2010 |
| KR | 10-1228105 B1 | 2/2013 |
| WO | 2012/112703 A1 | 8/2012 |

OTHER PUBLICATIONS

International Search Report, dated Nov. 21, 2016.
European Search Report dated May 14, 2018.
European Search Report dated Feb. 18, 2019.

*Primary Examiner* — Arun C Williams
(74) *Attorney, Agent, or Firm* — Cha & Reiter, LLC.

(57) ABSTRACT

According to various embodiments of the present disclosure, an electronic device comprising: a housing; a conductive pattern that is provided in the housing; and a controller that is electrically connected with the conductive pattern, configured to apply a current to the conductive pattern, monitor the current, and if the monitored current value exceeds a first threshold value for more than a selected time, changes the current value to a first selected value that is equal to or less than the first threshold value; wherein the conductive pattern is configured to generate induced electric power responsive to application of current by the controller. Various embodiments may be provided.

18 Claims, 11 Drawing Sheets

(56) References Cited

U.S. PATENT DOCUMENTS

| | | | |
|---|---|---|---|
| 2007/0139000 A1* | 6/2007 | Kozuma | H02J 5/005 |
| | | | 320/108 |
| 2007/0217125 A1* | 9/2007 | Johnson | H02J 9/062 |
| | | | 361/600 |
| 2007/0229053 A1* | 10/2007 | Mayell | G05F 1/575 |
| | | | 323/312 |
| 2008/0164766 A1* | 7/2008 | Adest | H02J 1/12 |
| | | | 307/80 |
| 2008/0205919 A1* | 8/2008 | Takagi | H02J 7/025 |
| | | | 399/50 |
| 2009/0016549 A1* | 1/2009 | French | G06F 1/266 |
| | | | 381/120 |
| 2009/0033283 A1* | 2/2009 | Beg | H02J 9/062 |
| | | | 320/128 |
| 2010/0244583 A1 | 9/2010 | Shimokawa | |
| 2012/0001496 A1 | 1/2012 | Yamamoto et al. | |
| 2013/0105115 A1 | 5/2013 | Kallmyer et al. | |
| 2013/0162200 A1 | 6/2013 | Terry et al. | |
| 2014/0084856 A1 | 3/2014 | Howard et al. | |
| 2014/0132207 A1 | 5/2014 | Fisher | |
| 2015/0042267 A1 | 2/2015 | Wang et al. | |
| 2015/0200563 A1 | 7/2015 | Zhang et al. | |
| 2015/0214750 A1 | 7/2015 | Moshkovich et al. | |
| 2015/0233990 A1 | 8/2015 | Lee et al. | |

* cited by examiner

ELECTRONIC DEVICE AND METHOD FOR CONTROLLING TEMPERATURE OF ELECTRONIC DEVICE

CLAIM OF PRIORITY

This application claims the priority under 35 U.S.C. § 119(a) to Korean Application Serial No. 10-2015-0119629, which was filed in the Korean Intellectual Property Office on Aug. 25, 2015, the entire content of which is hereby incorporated by reference.

TECHNICAL FIELD

The present disclosure relates to wireless charging, and more particularly, to a method for controlling the temperature of an electronic device in a wireless charging system and an electronic device thereof.

BACKGROUND

Portable terminals, such as mobile phones, or PDAs (Personal Digital Assistants), can be driven by a rechargeable battery. If a portable terminal uses a rechargeable battery, to charge the battery, a separate battery charger can supply electric power to the portable terminals. The battery charger and the battery can have connection ports formed on the outer surface thereof so that the connection ports come into contact with each other in order to thereby electrically connect the battery charger and the battery.

If the battery charger and the battery have connection ports formed on the outer surface, the connection ports are exposed to the outside and are susceptible to contamination by foreign substances. Contamination by foreign substances can bring about a malfunction in the battery charging. In addition, if the connection ports are exposed to moisture, the charging may not be carried out properly.

Wireless charging technology can use wireless power transmission and reception in which, for example, when the mobile phone is placed on a charging pad, the battery is automatically charged without connecting the battery to a separate charging connector. The wireless charging technology may improve a waterproofing function because the electronic devices are wirelessly charged, and may enhance the portability of the electronic devices by eliminating the wired charger.

The wireless charging technology may be divided into an electromagnetic induction type using coils, a resonance type using resonance, and an RF/Microwave radiation type that converts electric energy into microwaves to then be transmitted.

Moving a magnet with respect to a coil can generate an induction current. If an induction current is generated in a primary coil, the primary coil can generate an electromagnetic field causing an induced current in a secondary coil. The primary coil can be used in a transmitting end and the secondary coil can be used in a receiving end. An induced current can be generated in the receiving end according to a change in the magnetic field.

SUMMARY

In certain embodiments of the present disclosure relate to wireless charging, and more particularly, to a method for controlling the temperature of an electronic device in a wireless charging system and an electronic device thereof.

In existing electronic devices, an input current or the level of a current that is input into a conductive pattern is determined only by the charging level of a wireless power receiver. Therefore, if the charging efficiency of the wireless power receiver is low, or if the wireless power receiver is placed on the area of the electronic device, where the efficiency is low, a significantly high current or power may flow into the conductive pattern of the electronic device in order to transmit the power required by the wireless power receiver.

At this time, the current, which has not been transferred to the wireless power receiver and still flows through the conductive pattern of the electronic device, may be a major source of heat that increases the temperature of the electronic device.

Various embodiments of the present disclosure may provide an electronic device and a method for controlling (preventing) the increase in the temperature caused by the wireless power transmission in the electronic device, based on the input current that is applied to the conductive pattern provided in the electronic device in order to generate the wireless power to be transmitted for wireless charging.

In accordance with one embodiment of the present disclosure, there is presented an electronic device comprising: a housing; a conductive pattern that is provided in the housing; and a controller that is electrically connected with the conductive pattern, configured to apply a current to the conductive pattern, monitor the current, and if the monitored current value exceeds a first threshold value for more than a selected time, changes the current value to a first selected value that is equal to or less than the first threshold value; wherein the conductive pattern is configured to generate induced electric power responsive to application of current by the controller. In accordance with another aspect of the present disclosure, an electronic device may include: a conductive pattern that is provided in the electronic device; a sensing circuit that measures an input current value applied to the conductive pattern; and a controller that, if the measured input current value exceeds one or more predetermined threshold current values, controls to adjust the input current value to be equal to or less than one or more predetermined current values.

In accordance with another aspect of the present disclosure, a temperature control method of an electronic device may include: measuring an input current value, which is applied to a conductive pattern provided in the electronic device; and if the measured input current value exceeds one or more predetermined threshold current values, adjusting the input current value to a current value equal to or less than one or more predetermined current values.

According to various embodiments of the present disclosure, the electronic device (e.g., the wireless power transmitter) may measure an input current into the conductive pattern to compare the measured input current with a predetermined threshold current, and may adjust the input current to be reduced or increased according to the comparison result in order to thereby minimize the heat of the electronic device in the wireless power transmission.

According to various embodiments of the present disclosure, the input current supplied to the conductive pattern of the electronic device may be adjusted according to at least one of an internal or external temperature of the electronic device, or an internal or external temperature of the external electronic device (e.g., the wireless power receiver) in order to thereby control (or prevent) the increase in the temperature of the electronic device in the wireless power transmission.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
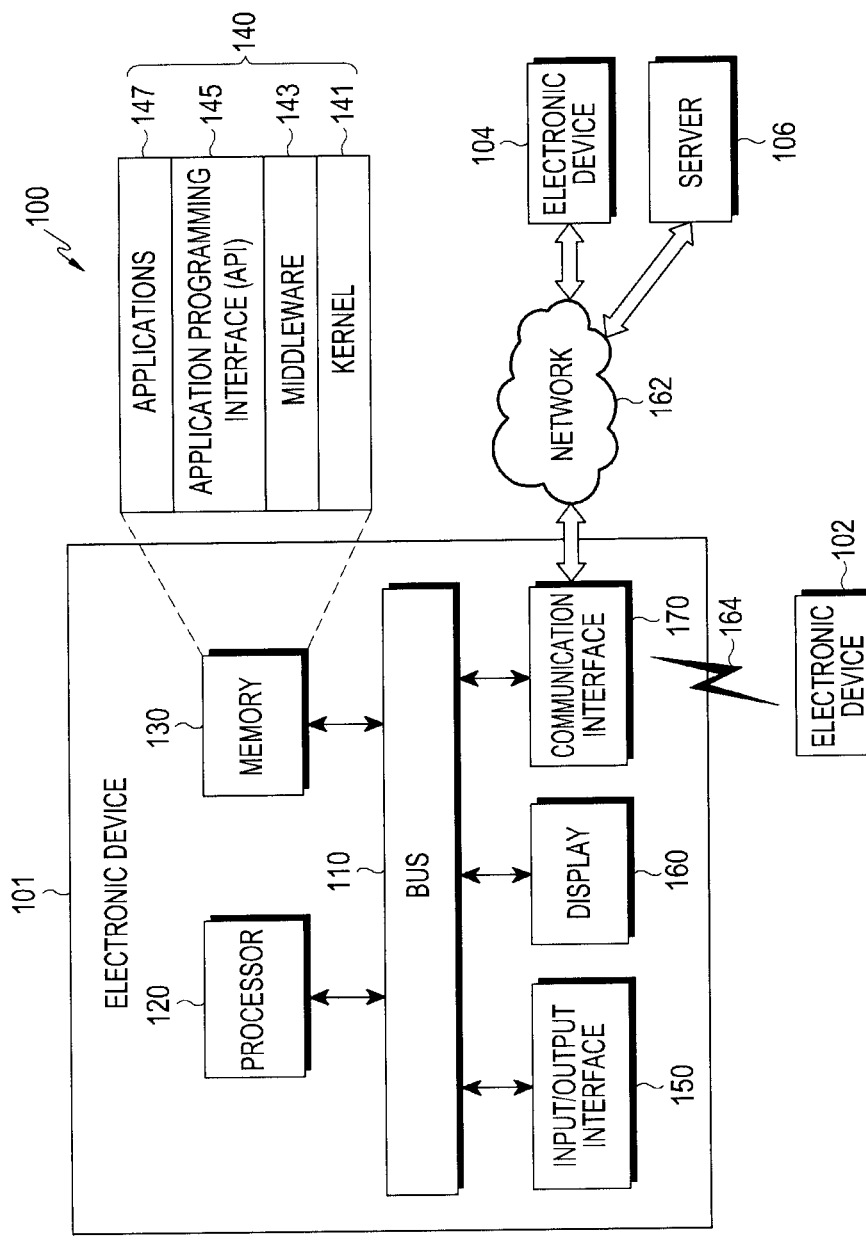
FIG. 1 illustrates an electronic device in a network environment, according to various embodiments.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

In the present disclosure, the expression "have", "may have", "include" or "may include" refers to existence of a corresponding feature (e.g., numerical value, function, operation, or components such as elements), and does not exclude existence of additional features.

In the present disclosure, the expression "A or B", "at least one of A or/and B", or "one or more of A or/and B" may include all possible combinations of the items listed. For example, the expression "A or B", "at least one of A and B", or "at least one of A or B" may include (1) at least one A, (2) at least one B, or (3) both at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

According to certain embodiments of the present invention, a wireless charging system may include an electronic device that transmits wireless power to an external electronic device that receives the transmitted wireless power. In some embodiments, the electronic device or external device may comprise some or all of the features shown in FIGS. 1-3. An electronic device or external device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

According to some embodiments, the electronic device or external device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device or external device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic device or external device for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device or external device may include at least one of a part of furniture or a building/structure, an electronic board, an electronic signature receiving device, a projector, and various kinds of measuring instruments (e.g., a water meter, an electric meter, a gas meter, and a radio wave meter). The electronic device or external device according to various embodiments of the present disclosure may be a combination of one or more of the aforementioned various devices. The electronic device or external device according to some embodiments of the present disclosure may be a flexible device. Further, the electronic device or external device according to an embodiment of the present disclosure is not limited to the aforementioned devices, and may include a new electronic device or external device according to the development of technology Hereinafter, an electronic device or external device according to various embodiments will be described with reference to the accompanying drawings. As used herein, the term "user" may indicate a person who uses an electronic device or external device or a device (e.g., an artificial intelligence electronic device or external device) that uses an electronic device or external device.

Referring to FIG. 1, in various embodiments, the electronic device or external device 101 in the network environment 100 is disclosed. The electronic device or external device 101 may include a bus 110, a processor 120, a memory 130, an input/output interface 150, a display 160, or a communication interface 170. In some cases, the electronic device or external device 101 may exclude at least one of the elements above, or may further include other elements.

The bus 110 may include a circuit for connecting the elements 120, 130, 150, 160, and 170 with each other and transferring communication data (e.g., control messages and/or data) between the elements.

The processor 120 may include at least one of a central processing unit (CPU), an application processor (AP), or a communication processor (CP). The processor 120, for example, may perform a calculation or data processing in relation to the control and/or communication of one or more other elements of the electronic device or external device 101. The processor 120 may be a controller, or may include the controller as a part thereof or may configure the controller.

The memory 130 may include a volatile and/or non-volatile memory. The memory 130, for example, may store instructions or data related to one or more other elements of the electronic device or external device 101. According to an embodiment, the memory 130 may store software and/or programs 140. The programs 140, for example, may include a kernel 141, middleware 143, an application programming interface (API) 145, and/or application programs (or "applications") 147. At least some of the kernel 141, the middleware 143, or the API 145 may be referred to as an operating system (OS).

The kernel 141, for example, may control or manage system resources (e.g., the bus 110, the processor 120, the memory 130, or the like) that are used in performing operations or functions implemented by other programs (e.g., the middleware 143, the API 145, or the application programs 147). In addition, the kernel 141 may provide an interface by which the middleware 143, the API 145, or the applications 147 may access each element of the electronic device 101 for control or management.

The middleware 143, for example, may play an intermediate role between the API 145 or the application programs 147 and the kernel 141 to communicate with each other for the transmission and reception of data.

Furthermore, the middleware 143 may process requests for operation received from the application programs 147 according to priority. For example, the middleware 143 gives priority for using system resources (e.g., the bus 110, the processor 120, or the memory 130) of the electronic device 101 to at least one of the application programs 147. For example, the middleware 143 may perform scheduling or load-balancing for the one or more requests by processing the requests according to the priority that is assigned to at least one of the application programs.

The API 145, for example, may be an interface by which the applications 147 control functions provided from the kernel 141 or the middleware 143, and it may include, for example, one or more interfaces or functions (e.g., instructions) for file control, window control, screen processing, or text control.

The input/output interface 150, for example, may transfer instructions or data input by the user or external devices to the other elements of the electronic device 101. In addition, the input/output interface 150 may output instructions or data received from the other elements of the electronic device 101 to the user or external devices.

The display 160, for example, may include a liquid crystal display (LCD), a light emitting diode (LED) display, an organic light emitting diode (OLED) display, a microelectro-mechanical system (MEMS) display, or an electronic paper display. The display 160, for example, may display a variety of content (e.g., text, screens, videos, icons, symbols, or the like) to the user. The display 160 may include a touch screen, and, for example, may receive a touch input by using electronic pens or a part of a user's body, a gesture input, a proximity input, or a hovering input.

The communication interface 170, for example, may configure communication between the electronic device or external device 101 and the another device (e.g., the device 102, the device 104, or a server 106). For example, the communication interface 170 may be connected to the network 162 through wireless or wired communication in order to thereby communicate with another device (e.g., device 104 or the server 106). The communication interface 170 may include a communication processor (CP), and the communication processor may constitute one or more modules that constitute the communication interface 170. In an embodiment, the communication processor may include the processor 120.

The wireless communication, for example, may use, as a cellular communication protocol, at least one of, for example, LTE (long-term evolution), LTE-A (LTE Advance), CDMA (code division multiple access), WCDMA (wideband CDMA, a UMTS (universal mobile telecommunications system), WiBro (Wireless Broadband), or a GSM (Global System for Mobile Communications). In addition, the wireless communication, for example, may include short-range communication 164. The short-range communication 164, for example, may include at least one of WiFi (Wireless Fidelity), Bluetooth (Bluetooth), NFC (near field communication), or a GNSS (global navigation satellite system). The GNSS may include at least one of, for example, a GPS (Global Positioning System), a Glonass (Global Navigation Satellite System), the Beidou Navigation Satellite System (hereinafter, "Beidou"), the Galileo, or the European global satellite-based navigation system, according to the service area or bandwidth. Hereinafter, in the present specification, "GPS" and "GNSS" may be interchangeably used. The wired communication, for example, may include at least one of a USB (universal serial bus), an HDMI (high definition multimedia interface), RS-232 (recommended standard 232), or a POTS (plain old telephone service). The network 162 may include one or more telecommunication networks, such as a computer network (e.g., LAN or WAN), the Internet, or a telephone network.

The devices 102 and 104 may be the same as, or different from, the electronic device or external device 101. According to an embodiment, the server 106 may include a group of one or more servers. According to various embodiments, all or some of the operations to be executed in the electronic device or external device 101 may be executed in one or more other devices (e.g., the device 102 or 104, or the server 106). According to an embodiment, when the electronic device or external device 101 is required to execute a certain function or service automatically or according to a request, the electronic device or external device 101 may make a request to the other devices (e.g., the device 102 or 104, or the server 106) for the execution of the function or service, additionally, together with at least some of the functions related thereto, instead of executing the function or service by itself. The other devices (e.g., the devices 102 and 104, or the server 106) may execute the requested function or additional function, and may transmit the result thereof to the electronic device or external device 101. The electronic device or external device 101 may additionally process the received result to then provide the requested function or service. To this end, for example, cloud computing, distributed computing, or client-server computing techniques may be used.

Figure 2:
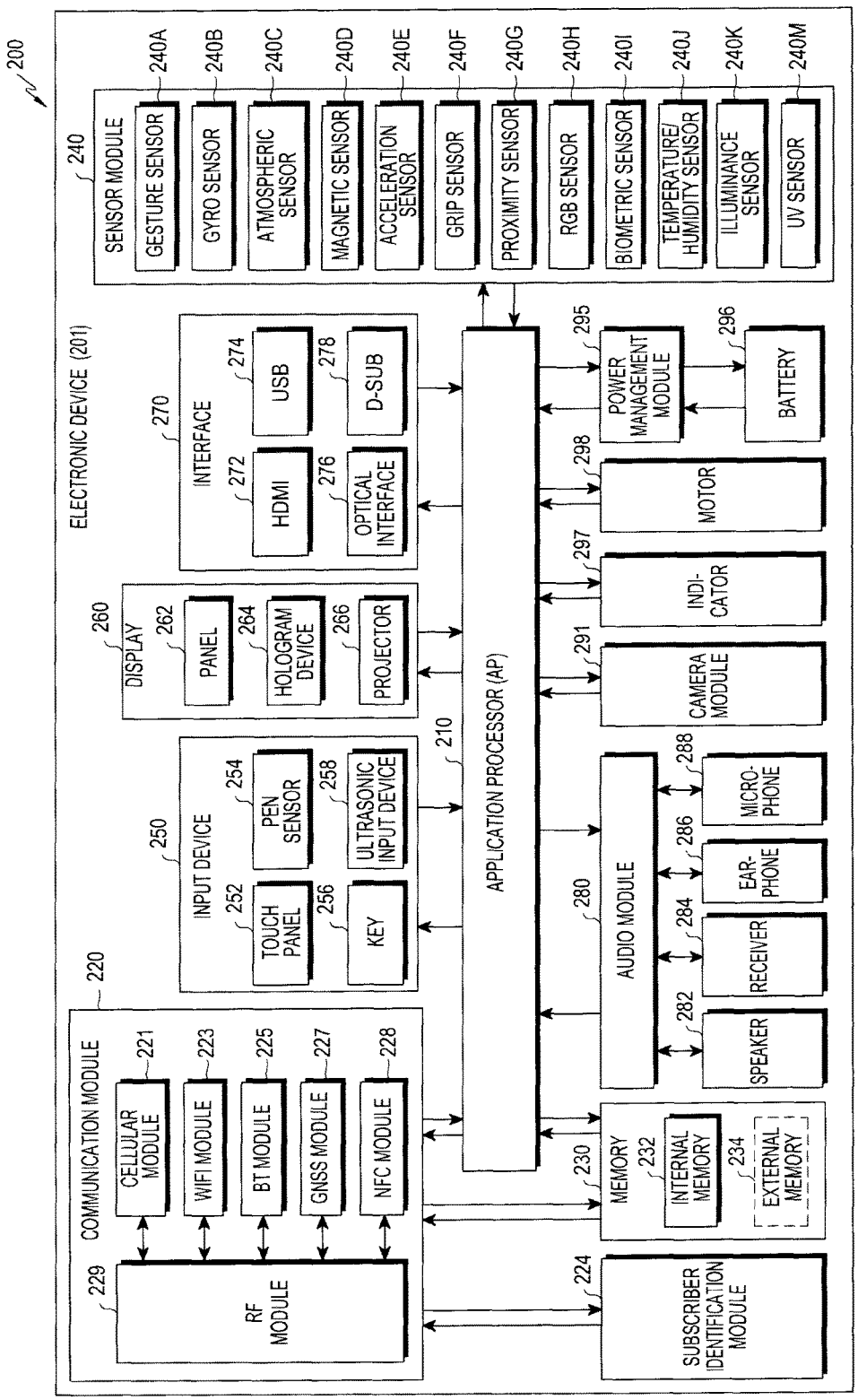
FIG. 2 is a block diagram of an electronic device, according to various embodiments.

FIG. 2 is a block diagram of the electronic device or external device 201, according to various embodiments. The electronic device or external device 201 may constitute a part or all of the electronic device or external device 101 shown in FIG. 1. The electronic device or external device 201 may include one or more processors {e.g., application processors (AP)} 210, a communication module 220, a memory 230, a sensor module 240, an input device 250, and a display 260, and may include at least one of a subscriber identification module 224, an interface 270, an audio module 280, a camera module 291, a power management module 295, a battery 296, an indicator 297, or a motor 298.

The processor 210, for example, may control a multitude of hardware or software elements connected with the AP 210 and may perform data processing and calculation by executing an operating system or application programs. The processor 210 may be implemented by, for example, system on chips (SoC). According to an embodiment, the processor 210 may further include a graphic processing unit (GPU) and/or an image signal processor. The processor 210 may include at least some of the elements (e.g., a cellular module 221) shown in FIG. 2. The processor 210 may load instructions or data received from one or more other elements (e.g., non-volatile memories) in the volatile memory to then be processed, and may store a variety of data in non-volatile memories.

The communication module 220 may have identical or similar elements to the communication interface 170 of FIG. 1. The communication module 220, for example, may include at least one of a cellular module 221, a Wi-Fi module 223, a BT module 225, a GNSS module 227 (e.g., a GPS module, a Glonass module, the Beidou module, or the Galileo module), an NFC module 228, and a radio frequency (RF) module 229.

The cellular module 221, for example, may provide the services of voice calls, video calls, and text messaging, or an Internet service through communication networks. According to an embodiment, the cellular module 221 may perform identification and authentication of the electronic device or external device 201 in the communication network by using the subscriber identification module (e.g., the SIM card 224). According to an embodiment, the cellular module 221 may perform at least some of the functions provided by the processor 210. According to an embodiment, the cellular module 221 may include a communication processor (CP).

Each of the Wi-Fi module 223, the BT module 225, the GNSS module 227, or the NFC module 228 may include a processor for processing data transmitted and received through the corresponding module. According to an embodiment, at least some (e.g., more than two) of the cellular module 221, the Wi-Fi module 223, the BT module 225, the GNSS module 227, or the NFC module 228 may be contained in a single integrated chip (IC or an IC package.

The RF module 229, for example, may transmit and receive communication signals (e.g., RF signals). The RF module 229 may include, for example, a transceiver, a power amp module (PAM), a frequency filter, a low noise amplifier (LNA), antennas, or the like. According to another embodiment, at least one of the cellular module 221, the Wi-Fi module 223, the BT module 225, the GNSS module 227, or the NFC module 228 may transmit and receive the RF signals through separated RF modules.

In the case where an electronic device 201 that transmits power to an external device, the RF module 229 may be configured to transmit power and include a power transmission circuit as will be described in greater detail below. The power transmission circuit can be controlled by the application processor 210 as will also be described in greater detail below.

In the case where the electronic device 201 is an external device charged by another electronic device, the RF module 229 may be configured to receive power and include a power reception circuit as will be described in greater detail below.

The SIM 224 may include a card adopting a subscriber identification module, and/or embedded SIM, and may include inherent identification information {e.g., an integrated circuit card identifier (ICCID)} or subscriber information {e.g., an international mobile subscriber identity (IMSI)}.

The memory 230, for example, may include an internal memory 232 or an external memory 234. The internal memory 232 may include at least one of volatile memories {e.g., a dynamic RAM (DRAM), a static RAM (SRAM), a synchronous dynamic RAM (SDRAM), or the like}, or non-volatile memories {e.g., an one time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, or a NOR flash memory), a hard drive, a solid state drive (SSD), or the like}.

The external memory 234 may further include a flash drive, for example, a compact flash (CF), a secure digital (SD), a micro secure digital (Micro-SD), a mini secure digital (Mini-SD), an extreme digital (xD), a memory stick, or the like. The external memory 234 may be functionally and/or physically connected with the electronic device or external device 201 through various interfaces.

The sensor module 240, for example, may measure physical quantities and may detect an operation state of the electronic device or external device 201, to thereby convert the measured or detected information to electric signals. The sensor module 240 may include at least one of, for example, a gesture sensor 240A, a gyro-sensor 240B, an atmospheric sensor 240C, a magnetic sensor 240D, an acceleration sensor 240E, a grip sensor 240F, a proximity sensor 240G, a color sensor 240H {e.g., a red-green-blue (RGB) sensor}, a biometric sensor 240I, a temperature/humidity sensor 240J, an illuminance sensor 240K, or an ultra violet (UV) sensor 240M. Alternatively or additionally, the sensor module 240 may further include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling at least one sensor included therein. In some cases, the electronic device or external device 201 may further include a processor that is configured to control the sensor module 240, as a part of the processor 210 or separately from the same, in order to thereby control the sensor module 240 while the processor 210 are in a sleep mode.

The input device 250, for example, may include a touch panel 252, and may include at least one of a (digital) pen sensor 254, keys 256, or an ultrasonic input device 258. The touch panel 252 may use at least one of, for example, a capacitive type, a pressure-sensitive type, an infrared type, or an ultrasonic type. In addition, the touch panel 252 may further include a control circuit. The touch panel 252 may further include a tactile layer in order to thereby provide a user with a tactile reaction.

The (digital) pen sensor 254 may be implemented by using, for example, a method that is identical or similar to a user's touch input or by using a separate recognition sheet. The keys 256 may include, for example, physical buttons, optical keys, or a keypad. The ultrasonic input device 258 detects acoustic waves with a microphone (e.g., a microphone 288) in the electronic device or external device 201 through an input means that generates ultrasonic signals to thereby identify data.

The display 260 (e.g., the display 160) may include a panel 262, and may further include a hologram device 264, and/or a projector 266. The panel 262 may include the identical or similar elements to the display 160 of FIG. 1. The panel 262 may be implemented to be, for example, flexible, transparent or wearable. The panel 262 may be configured with the touch panel 252 as a single module. The hologram device 264 may display 3D images in the air by using interference of light. The projector 266 may display images by projecting light onto a screen. The screen may be positioned, for example, inside or outside the electronic device or external device 201. According to an embodiment, the display 260 may further include a control circuit for controlling the panel 262, the hologram device 264, or the projector 266.

The interface 270 may include at least one of, for example, a high-definition multimedia interface (HDMI) 272, a universal serial bus (UBS) 274, an optical interface 276, or a D-subminiature (D-sub) 278. The interface 270 may be included in, for example, the communication interface 170 shown in FIG. 1. Additionally or alternatively, the interface 270 may include, for example, a mobile high-definition link (MHL) interface, a secure digital (SD) card/multi-media card (MMC) interface or an infrared data association (IrDA) standard interface.

The audio module 280 may convert a sound into an electric signal, and vice versa. At least some elements of the audio module 280 may be included, for example, in the input/output interface 150 shown in FIG. 1. For example, the audio module 280 may process voice information input or output through a speaker 282, a receiver 284, earphones 286 or a microphone 288.

The camera module 291 is a device for photographing still and moving images, and, according to an embodiment of the present disclosure, it may include at least one image sensor (e.g., a front sensor or a rear sensor), lenses, an image signal processor (ISP), or a flash (e.g., LED or a xenon lamp).

The power management module 295 may manage the power of the electronic device or external device 201. According to an embodiment, the power management module 295 may include a power management integrated circuit (PMIC), a charger integrated circuit (IC), or a battery or fuel gauge. The PMIC may use a wired charging type and/or a wireless charging type. The wireless charging type may encompass, for example, a magnetic resonance type, a magnetic induction type, or an electromagnetic wave type, and may include additional circuits for wireless charging, such as coil loops, resonance circuits, rectifiers, or the like. The battery gauge may measure, for example, the remaining power of the battery 296, a charging voltage and current, or temperature. The battery 296 may include, for example, a rechargeable battery or a solar battery.

The indicator 297 may display a specific state, for example, a booting state, a message state or a charging state of the whole or a part (e.g., the processor 210) of the electronic device or external device 201. The motor 298 may convert electric signals to a mechanical vibration, and may generate a vibration effect or a haptic effect. Although it is not shown in the drawings, the electronic device or external device 201 may include a processing device (e.g., a GPU) for supporting mobile TV. The processing device for supporting the mobile TV may process media data according to a standard such as, for example, digital multimedia broadcasting (DMB), digital video broadcasting (DVB) or media flow.

Each of the above-described component elements of hardware according to the present disclosure may be configured with one or more components, and the names of the corresponding component elements may vary based on the type of electronic device or external device. The electronic device or external device according to various embodiments of the present disclosure may include at least one of the aforementioned elements. Some elements may be omitted or other additional elements may be further included in the electronic device or external device. Also, some of the hardware components according to various embodiments may be combined into one entity, which may perform functions identical to those of the relevant components before the combination.

Figure 3:
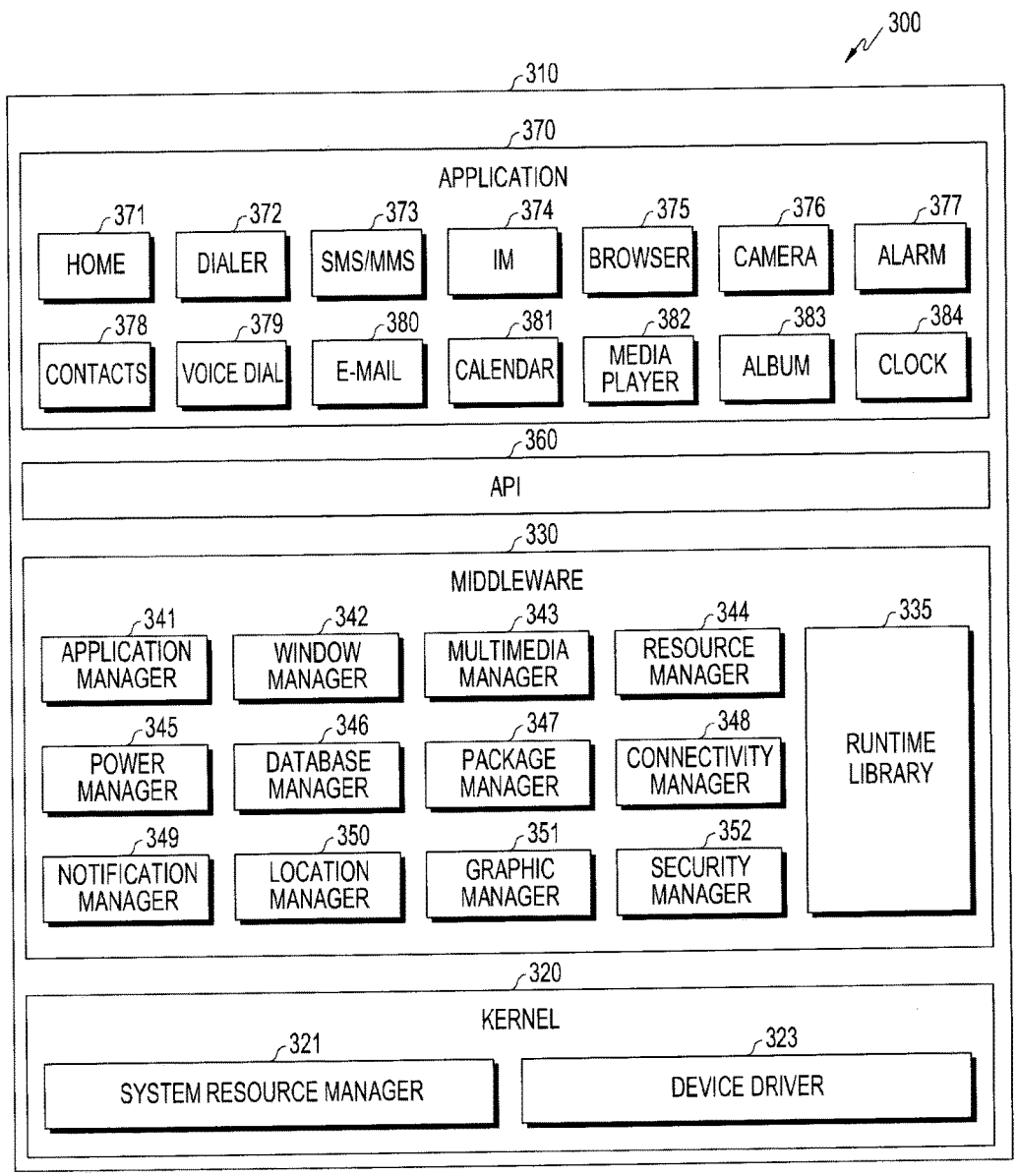
FIG. 3 is a block diagram of a program module, according to various embodiments.

FIG. 3 is a block diagram of a program module, according to various embodiments. According to an embodiment, the program module 310 (e.g., the programs 140) may include an operating system (OS) that controls resources related to the electronic device or external device, and/or various applications (e.g., application programs 147) that are executed under the OS. The OS may be, for example, Android, iOS, Windows, Symbian, Tizen, Bada, or the like.

The program module 310 may include a kernel 320, middleware 330, an API (application programming interface) 360, and/or applications 370. At least some of the program module 310 may be pre-loaded in the electronic device or external device, or may be downloaded from other devices (e.g., device 102 or 104, or the server 106).

The kernel 320 (e.g., the kernel 141 of FIG. 1), for example, may include a system resource manager 321 or a device driver 323. The system resource manager 321 may perform a control, allocation, or collection of system resources. According to an embodiment, the system resource manager 321 may include a process managing unit, a memory managing unit, or a file system managing unit. The device driver 323, for example, may include a display driver, a camera driver, a Bluetooth driver, a shared memory driver, a USB driver, a keypad driver, a Wi-Fi driver, an audio driver, or inter-process communication (IPC) driver.

The middleware 330, for example, may provide common functions necessary for the applications 370, or may provide the applications 370 with various functions through the API 360 in order for the applications 370 to effectively use limited system resources inside the electronic device or external device. According to an embodiment, the middleware 330 (e.g., the middleware 143) may include at least one of a run-time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The run-time library 335, for example, may include a library module that a compiler uses in order to add new functions through programming language while the applications 370 are executed. The run-time library 335 may perform functions of the input/output management, the memory management, or arithmetic calculation.

The application manager 341 may manage a life cycle of at least one of the applications 370. The window manager 342 may manage a GUI resource used in a screen. The multimedia manager 343 may recognize formats that are necessary for the reproduction of various media files, and may perform encoding or decoding of the media files using codecs corresponding to the formats. The resource manager 344 may manage resources, such as a source code of one or more applications 370, memories, or storages.

The power manager 345 may manage a battery or a power source in association with a basic input/output system (BIOS), and may provide power information necessary for the operation of the electronic device or external device. The database manager 346 may create, search, or change a database used in one or more applications 370. The package manager 347 may manage the installation or update of the application distributed in the form of a package file.

The connectivity manager 348, for example, may manage a wireless connection of Wi-Fi or Bluetooth. The notification manager 349 may display or notify of events, such as received massages, appointments, or proximity notifications, in a manner that does not disturb a user. The location manager 350 may manage location information of the electronic device or external device. The graphic manager 351 may manage graphic effects to be provided to a user and interfaces related thereto. The security manager 352 may provide general security functions necessary for system security or user authentication. According to an embodiment, in the case where the electronic device or external device (e.g., the electronic device or external device 101) adopts a phone call function, the middleware 330 may further include a telephony manager to manage a voice or video phone call function of the electronic device or external device.

The middleware 330 may include contain a middleware module that includes a combination of various functions of the above-described elements. The middleware 330 may provide modules that are specialized according to the type of operating system in order to provide differentiated functions. In addition, the middleware may dynamically exclude some of the existing elements, or may further include new elements.

The API 360 (e.g., the API 145), which is a group of API programming functions, may be provided to have a different configuration according to operating systems. For example, in the case of Android or iOS, a single API set may be provided for each platform. In the case of Tizen, two or more API sets may be provided.

The applications 370 (e.g., the application programs 147), for example, may include at least one of a home application 371, a dialer application 372, a short message server (SMS)/multi-media message service (MMS) application 373, an instant message (TM) application 374, a browser application 375, a camera application 376, an alarm application 377, a contact list application 378, a voice dial application 379, an e-mail application 380, a calendar application 381, a media player application 382, an album application 383, a clock application 384, a healthcare application (e.g., for measuring the amount of exercise or blood glucose), or an environmental information providing application (e.g., providing atmospheric pressure information, humidity information, or temperature information).

According to an embodiment, the applications 370 may include an application (hereinafter, referred to as "information-exchange application" for convenience of explanation) that supports the exchange of information between the electronic device or external device (e.g., the electronic device or external device 101) and devices (e.g., the device 102 or 104). The information-exchange application may include, for example, a notification relay application for relaying specific information to the devices, or a device management application for managing the devices.

For example, the notification relay application may include a function of transferring notification information created in other applications (e.g., the SMS/MMS application, the e-mail application, the healthcare application, or the environmental information application) of the electronic device or external device to devices (e.g., the devices 102 and 104). In addition, the notification relay application, for example, may receive the notification information from the devices in order to thereby provide the same to the user.

The device management application, for example, may manage (e.g., install, delete, or update) at least some functions {e.g., turning device (or some elements) on or off, or adjusting the brightness (or resolution) of a display} of the device (e.g., the device 104) that communicates with the device 101, applications executed in the device, or services (e.g., a phone call service, or a messaging service) provided from the device.

According to an embodiments, the applications 370 may include applications (e.g., the healthcare application), which are designated according to the properties (e.g., the type of electronic device or external device, such as a mobile medical device) of the device (e.g., the device 102 or 104). According to an embodiment, the applications 370 may include applications that are received from the devices (e.g., the device 102 or 104, or the server 106). According to an embodiment, the applications 370 may include preloaded applications or third party applications that may be downloaded from the servers. Names of the elements of the program module 310, according to the above-described embodiments of the present disclosure, may change depending on the type of OS.

According to various example embodiments of the present disclosure, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

Figure 4:
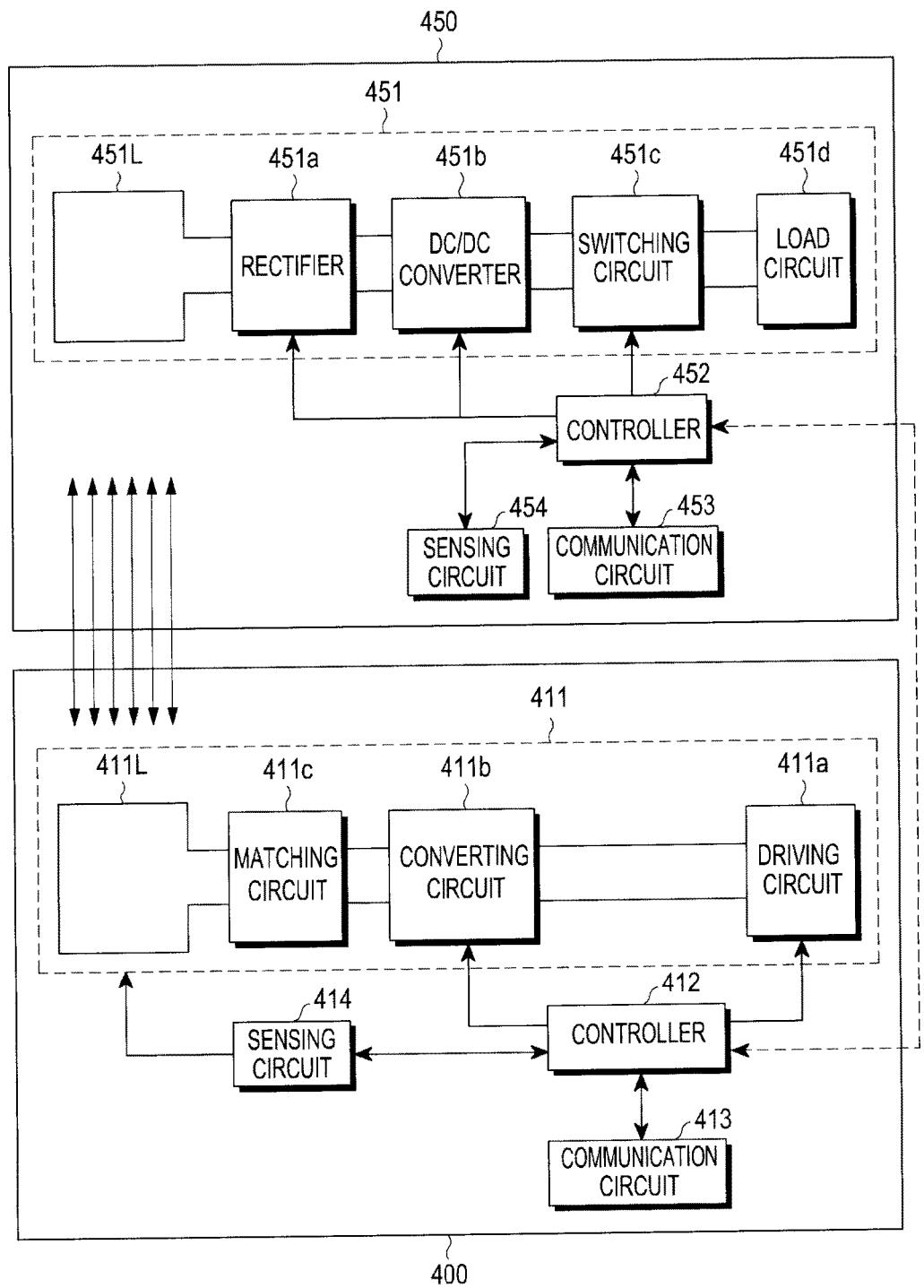
FIG. 4 is a block diagram of a wireless charging system, according to an embodiment of the present disclosure.

FIG. 4 is a block diagram of a wireless charging system, according to an embodiment of the present disclosure. Referring to FIG. 4, the wireless charging system, according to an embodiment of the present disclosure, may include an electronic device 400 that transmits the wireless power, and an external electronic device 450 that receives the transmitted wireless power. The electronic device 400 (e.g., the wireless power transmitter) may include all or some of the elements of the electronic device 101 of FIG. 1 or electronic device 201 of FIG. 2. The external electronic device 450 (e.g., the wireless power receiver) may include all or some of the elements of the devices 102 or 104 shown in FIG. 1.

The electronic device 400, according to an embodiment of the present disclosure, may include a power transmission circuit 411, a controller 412, a communication circuit 413, and a sensing circuit 414, and each element may be disposed in a housing. The external electronic device 450 may include a power reception circuit 451, a controller 452, a communication circuit 453, and a sensing circuit 454, and each element may be disposed in a housing.

The power transmission circuit 411 may provide power used by the external electronic device 450 that receives the wireless power, and may provide power to the external electronic device 450 in a wireless method. Here, the power transmission circuit 411 may provide the external electronic device 450 with power in an alternating current waveform. For example, the power transmission circuit 411 may receive power in a direct current or alternating current waveform from the outside. If the power transmission circuit 411 receives power in the direct current waveform, the power transmission circuit 411 may convert the direct current power into the alternating current power by using an inverter to then provide the same. The power transmission circuit 411 may be implemented in the form of a built-in battery, or may be implemented in the form of a power receiving interface that receives power from the outside and supplies the same to other elements.

The power transmission circuit 411, for example, may include a loop coil 411L made of a conductive pattern, and may further include at least one of a driving circuit 411a, a converting circuit 411b, or a matching circuit 411c.

The driving circuit 411a may output a direct current power that has a predetermined voltage value. The voltage value of the direct current power output from the driving circuit 411a may be controlled by the controller 412. The alternating current power or direct current power may be output from the driving circuit 411a to the converting circuit 411b.

The converting circuit 411b may convert the direct current from the driving circuit 411a into an alternating current. The converting circuit 411b may include a predetermined amplifier (not shown), and if the direct current input through the driving circuit 411a is smaller than a predetermined gain, the direct current may be amplified to the predetermined gain by using the amplifier. Furthermore, the converting circuit 411b may convert the direct current input from the driving circuit 411a into the alternating current, based on a signal received from the controller 412. Accordingly, the converting circuit 411b may output the alternating current power.

The matching circuit 411c may perform impedance matching. For example, the impedance, as viewed from the matching circuit 411c, may be adjusted in order to thereby output a high efficiency power or a high power. The matching circuit 411c may adjust the impedance on the basis of the control of the controller 412. The matching circuit 411c may include at least one of an inductor (e.g., coils) or a capacitor. The controller 412 may control the connection status with at least one of the inductor or the capacitor, and thus the impedance matching may be conducted.

The power transmission circuit 411 is not limited thereto, and all means for providing a constant alternating current power may be applied.

In addition, the power transmission circuit 411 may provide the alternating current power in the form of an electromagnetic wave to the external electronic device 450. The power transmission circuit 411 and the power reception circuit 451 may include loop coils 411L and 451L formed of a conductive pattern. The alternating current power, which is applied to the loop coil 411L of the power transmission circuit 411, may generate an induced electric power in order to thereby supply the power to the loop coil 451L of the adjacent power reception circuit 451. For example, when the current is applied to the loop coil 411L, the power transmission circuit 411 may transmit, to loop coil 451L of the power reception circuit 451, the wireless power in the electromagnetic waveform corresponding to the applied current. The power transmission circuit 411 may further include a resonance circuit, and if the power transmission circuit 411 is implemented by the resonance circuit, the inductance (L) of the loop coil of the resonance circuit may vary. Meanwhile, it is obvious to those skilled in the art that all means that can transmit and receive electromagnetic waves may be applied to the power transmission circuit 411.

The sensing circuit 414 (e.g., the sensor module 240 of the electronic device 201) may sense a change in the current that is applied to the loop coil 411L of the power transmission circuit 411. When the sensed current converges on a constant level, the sensing circuit 414 may provide the controller 412 with the value as a value of the input current that is applied to the loop coil 411L. In addition, the sensing circuit 414 may sense a change in the temperature of the electronic device 400. For example, the sensing circuit 414 may measure at least one of an internal temperature value or an external temperature value of the electronic device 400.

The controller 412 (e.g., the processor 120 of the electronic device 101, or the processor 210 of the electronic device 201) may control the overall operation of the electronic device 400. The controller 412 may control the overall operation of the electronic device 400 by using algorithms, programs, or applications for the control, which are stored in the storage circuit (e.g., the memory 130). The controller 412 may be implemented in the form of a CPU, a microprocessor, or a mini-computer. If an input current value that is measured through the sensing circuit 414 exceeds one or more predetermined threshold current values, the controller 412 may adjust the input current value to a current value equal to or less than one or more predetermined current levels. Furthermore, if a temperature measured through the sensing circuit 414 exceeds one or more predetermined threshold temperature values, the controller 412 may adjust the input current value to a current value equal to or less than one or more predetermined current levels. The detailed operation of the controller 412 will be described later.

The communication circuit 413 (e.g., the communication interface 170 or the communication module 220) may communicate with the external electronic device 450 in a predetermined method. The communication circuit 413 may receive a signal regarding information on the external electronic device 450. For example, the communication circuit 413 may receive, from the external electronic device 450, at least one of the internal temperature or the external temperature of the external electronic device 450, which is measured through the sensing circuit 454. The communication circuit 413 may communicate with the communication circuit 453 of the external electronic device 450 by using NFC (near field communication), Zigbee communication, infrared communication, visible light communication, Bluetooth communication, BLE (Bluetooth Low Energy) communication, or the like. Meanwhile, the above-described communication methods are only the examples, and the scope of the present disclosure is not limited to a specific communication method performed by the communication circuit 413.

Meanwhile, the communication circuit 413 may transmit a signal regarding information on the electronic device 400. Here, the communication circuit 413 may unicast, multicast, or broadcast the signal.

In addition, the communication circuit 413 may receive power information from the external electronic device 450. Here, the power information may include at least one of a (total) battery capacity, a battery percentage, the number of charging times, the amount of usage, or a battery ratio of the total battery capacity to the battery percentage of the external electronic device 450.

In addition, the communication circuit 413 may transmit a charging function control signal for controlling the charging function of the external electronic device 450. The charging function control signal may control the power reception circuit 451 of a specific external electronic device 450 so that the charging function may be enabled or disabled.

The communication circuit 413 may receive signals from other wireless power transmission devices (not shown) as well as the external electronic device 450. Although the communication circuit 413 is configured with different hardware from the power transmission circuit 411 and the electronic device 400 communicates in an out-of-band scheme in FIG. 4, this is only an example. In the present disclosure, the power transmission circuit 411 and the communication circuit 413 may be implemented as a single hardware module so that the electronic device 400 may communicate in an in-band scheme.

The electronic device 400 and the external electronic device 450 may transmit and receive various signals through the communication circuits 413 and 453, respectively.

Meanwhile, the power reception circuit 451 of the external electronic device 450, according to an embodiment of the present disclosure, may receive the charging power from the power transmission circuit 411 of the electronic device 400. The power reception circuit 451 may be implemented in the form of a built-in battery, or may be implemented in the form of a power receiving interface in order to thereby receive power from the outside.

The power reception circuit 451, for example, may include a loop coil 451L made of a conductive pattern, and may further include at least one of a rectifier 451a, a DC/DC converter 451b, a switching circuit 451c, or a load circuit 451d.

The rectifier 451a may rectify the wireless power received by the power reception circuit 451 into a direct current form, and, for example, may be implemented in the form of a diode bridge.

The DC/DC converter 451b may convert the rectified power to a predetermined gain. For example, the DC/DC converter 451b may convert the rectified power such that the output end has a voltage of 5 V. Meanwhile, minimum and maximum values applied to the front end of the DC/DC converter 451b may be pre-configured.

The switching circuit 451c may connect the DC/DC converter 451b to the load circuit 451d. The switching circuit 451c may maintain the on/off-state according to the control of the controller 452.

The load circuit 451d may receive the power input from the DC/DC converter 451b when the switching circuit 451c is in the on-state.

The sensing circuit 454 may sense a change in the temperature of the external electronic device 450. For example, the sensing circuit 454 may measure at least one of an internal temperature or an external temperature of the external electronic device 450. The controller 452 may transmit at least one of the measured internal temperature or external temperature of the external electronic device 450 to the electronic device 400 through the communication circuit 453.

Although the electronic device 400 and the external electronic device 450, according to an embodiment of the present disclosure, include only the power transmission circuit 411 and the power reception circuit 451, respectively, in FIG. 4, each of the electronic device 400 and the external electronic device 450 may include both the power transmission circuit 411 and the power reception circuit 451. Accordingly, the electronic device 400, according to the present disclosure, may operate as the wireless power receiver as well as the wireless power transmitter.

According to various embodiments, an electronic device may include: a housing; a conductive pattern that is provided in the housing; and a controller that is electrically connected with the conductive pattern, configured to apply a current to the conductive pattern, monitors the current, and if the monitored current value exceeds the first threshold value for more than a selected time, changes the current value to a selected value equal to or less than the first threshold value, wherein the conductive pattern is configured to generate induced electric power responsive to application of current by the controller.

According to various embodiments, the controller, if the monitored current value is greater than a second threshold value for more than a selected time, may change the current value to a second selected value that is equal to or less than the second threshold value.

According to various embodiments, the controller, if the monitored current value is between the first threshold value and the second threshold value for more than a selected time, may maintain the current value.

According to various embodiments, the controller may control to change the current value to a selected value equal to or less than the first threshold value, based on at least one of an internal temperature of the electronic device, an external temperature of the external device, or an ambient temperature of the electronic device or the external device, which is measured through a sensor that is electrically connected with the electronic device or the external device.

According to various embodiments, an electronic device may include: a housing; a conductive pattern that is provided in the housing; a sensing circuit that measures an input current value applied to the conductive pattern; and a controller that, if the measured input current value exceeds one or more predetermined threshold current values, controls to adjust the input current value to be equal to or less than one or more predetermined current values.

According to various embodiments, the controller may control the sensing circuit to: determine whether or not the current applied to the conductive pattern is sensed; if the current is sensed, determine whether or not the sensed current converges on a constant current level; and if the sensed current converges on the constant current level, provide the converged current level as the input current value.

According to various embodiments, the controller, if the measured input current value is equal to or less than the one or more predetermined threshold current values, may maintain the input current value.

According to various embodiments, the controller may: if the measured input current value is equal to or less than the first predetermined threshold current value, maintain the input current value; if the measured input current value is more than the first predetermined threshold current value and is less than the second predetermined threshold current value, which is more than the first predetermined threshold current value, adjust the input current value to the first predetermined current value that is less than the first threshold current value; and if the measured input current value is equal to or more than the second predetermined threshold current value, adjust the input current value to the second predetermined current value that is equal to or less than the first current value.

According to various embodiments, the controller may: if the measured input current value is equal to or less than the first predetermined threshold current value, adjust the input current value to the first predetermined current value, which is equal to or more than the first predetermined threshold current value and is equal to or less than the second predetermined threshold current value, which is more than the first predetermined threshold current value; if the measured input current value is more than the first predetermined threshold current value and is less than the second predetermined threshold current value, maintain the input current value; and if the measured input current value is equal to or more than the second predetermined threshold current value, adjust the input current value to the second predetermined current value, which is equal to or more than the first predetermined threshold current value and is equal to or less than the second predetermined threshold current value.

According to various embodiments, the controller may further control to transmit the wireless power corresponding to the controlled input current value to the external electronic device.

According to various embodiments, the controller, if the measured input current value is changed after transmitting the wireless power, may control to determine whether or not the wireless power is to be transmitted, based on the comparison result of the changed input current value and a predetermined minimum charging current value.

According to various embodiments, the controller may: if the changed input current value is equal to or more than the minimum charging current value, determine to transmit the wireless power corresponding to the input current value that is controlled according to the changed input current value; and if the changed input current value is less than the minimum charging current value, determine to stop the wireless power transmission.

According to various embodiments, the controller may: sense at least one of an internal temperature or an external temperature of the electronic device through the sensing circuit; compare at least one of the sensed internal temperature or external temperature with one or more predetermined threshold temperatures; and control the input current value based on the comparison result.

According to various embodiments, the controller may: if the sensed temperature is equal to or less than a predetermined threshold temperature, maintain the measured input current value; and if the sensed temperature exceeds the predetermined threshold temperature, adjust the input current value to a current value less than the predetermined threshold current value.

According to various embodiments, the electronic device may further include a communication circuit that is provided in the housing, wherein the controller receives data related to at least one of an internal temperature or an external temperature of the external electronic device through the communication circuit, and controls the input current value based on the received data.

Figure 5:
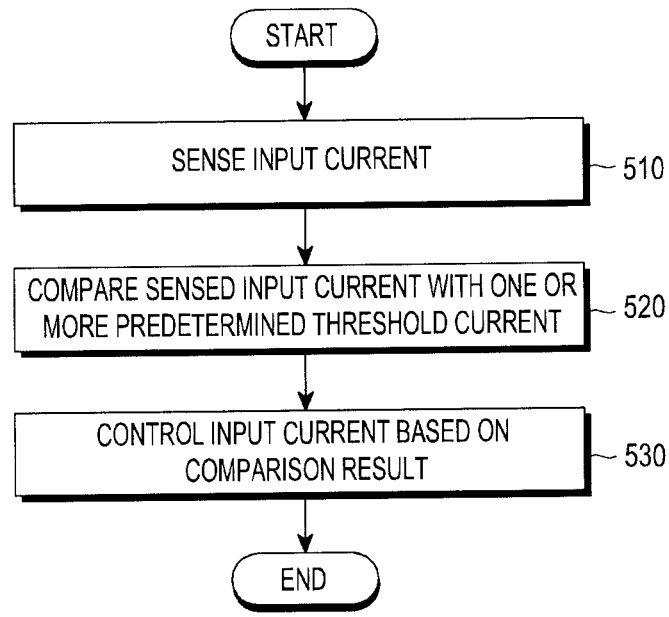
FIG. 5 is a flowchart showing a temperature control method of an electronic device, according to an embodiment of the present disclosure.

FIG. 5 is a flowchart showing a temperature control method in the electronic device 400, according to an embodiment of the present disclosure. The temperature control method of the electronic device, according to an embodiment of the present disclosure, may include operation 510 to operation 530. The temperature control method of the electronic device 400 may be performed by at least one of the electronic device 400, the processor of the electronic device (e.g., the processors 120 and 210 of the electronic devices 101 and 201), or the controller (e.g., the controller 412) of the electronic device.

In operation 510, for example, the electronic device 400, according to an embodiment of the present disclosure, may measure, through the sensing circuit 414, an input current value, which is applied to the loop coil 411L, which is made of a conductive pattern in the power transmission circuit 411.

According to an embodiment, when a request for the wireless power transmission is received from the external electronic device 450, the electronic device 400, according to an embodiment of the present disclosure, may measure the input current value, which is applied to the loop coil 411L. The request for the wireless power transmission may include information on the amount of power required by the external electronic device 450. For example, the electronic device 400 may make a request to the user of the external electronic device 450 for changing the needed power to be increased or reduced. When the request is received from the external electronic device 450, the electronic device may measure the input current value to be applied to the loop coil 411L.

According to an embodiment, the sensing circuit 414 may measure the input current value to be applied to the loop coil 411L, and may provide the same to the controller 412.

According to an embodiment, the controller 412 may control the sensing circuit 414 to measure the input current value to be applied to the loop coil 411L.

According to an embodiment, the sensing circuit 414 may include a current/voltage sensor.

In operation 520, for example, the electronic device, according to an embodiment of the present disclosure, may compare the measured input current value with one or more predetermined threshold current values.

In operation 530, for example, the electronic device, according to an embodiment of the present disclosure, may control the input current value based on the comparison result of the measured input current value and the one or more predetermined threshold current values. The operation 530 will be described in detail with reference to FIG. 7 to FIG. 9 later.

Figure 6:
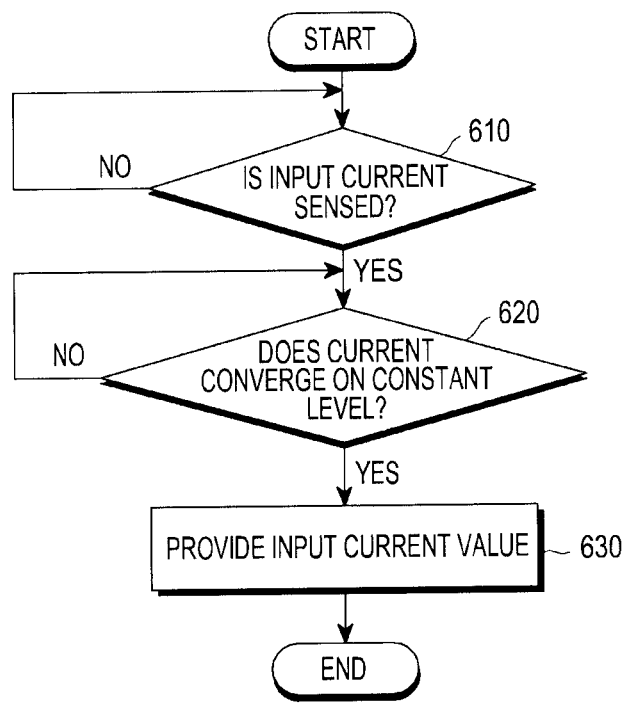
FIG. 6 is a flowchart showing a temperature control method of an electronic device, according to an embodiment of the present disclosure.

FIG. 6 is a flowchart showing a temperature control method of the electronic device, according to an embodiment of the present disclosure. FIG. 6 is a detailed flowchart showing the input current detecting method according to the temperature control method of the electronic device shown in FIG. 5, and the input current detecting method of the electronic device may include operation 610 to operation 630. The input current detecting method of the electronic device may be performed by at least one of the electronic device 400, the processor of the electronic device (e.g., the processors 120 and 210 of the electronic devices 101 and 201), or the controller (e.g., the controller 412) of the electronic device.

In operation 610, for example, the electronic device 400 may determine whether or not a current, which is applied to the loop coil 411L made of a conductive pattern in the power transmission circuit 411, is sensed through the sensing circuit 414. When the current is sensed, the electronic device 400 may perform operation 620. Otherwise, the electronic device 400 may repeat the operation 610 periodically or aperiodically.

For example, when the current is sensed, the electronic device may determine whether or not the sensed current converges on a constant level in operation 620. If the sensed current converges on the constant level, the electronic device may perform operation 630. Otherwise, the electronic device 400 may repeat operation 620.

According to an embodiment, the controller 412 of the electronic device 400 may accumulate and calculate current values that are sensed for a specific period of time through the sensing circuit 414, and may determine whether or not the calculated value converges on the constant level.

According to an embodiment, the sensing circuit 414 of the electronic device 400 may determine whether or not a current value that is sensed and accumulated for a specific period of time converges on the constant level.

In operation 630, for example, the electronic device 400 may determine the current value that converges on the constant level as the input current value to be applied to the loop coil 411L.

According to an embodiment, the electronic device 400 may transmit, to the controller 412, the current value, which is determined to converge on the constant level by the sensing circuit 414.

Figure 7:
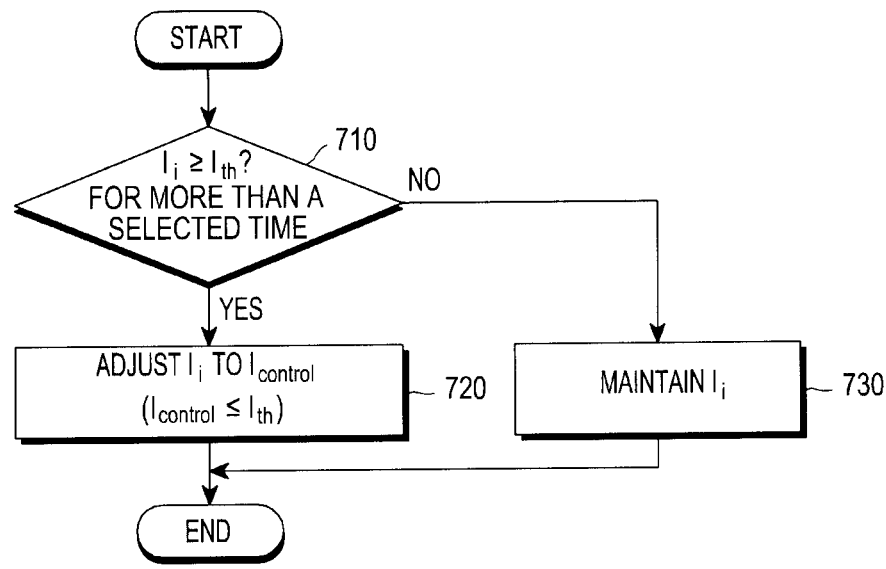
FIG. 7 is a flowchart showing a temperature control method of an electronic device, according to an embodiment of the present disclosure.

FIG. 7 is a flowchart showing a temperature control method of the electronic device, according to an embodiment of the present disclosure. FIG. 7 is a detailed flowchart showing the input current control operation (e.g., element 530 of FIG. 5) of the temperature control method in the electronic device shown in FIG. 5, and the input current control operation 530 of the electronic device may include operation 710 to operation 730. The input current control operation 530 of the electronic device may be performed by at least one of the electronic device 400, the processor of the electronic device (e.g., the processors 120 and 210 of the electronic devices 101 and 201), or the controller (e.g., the controller 412) of the electronic device.

In operation 710, for example, the electronic device may determine whether or not the measured input current value ($I_i$) is equal to or more than a predetermined threshold current value ($I_{th}$) for more than a selected time. If the measured input current value ($I_i$) is equal to or more than the predetermined threshold current value ($I_{th}$) for more than the selected time, the electronic device may perform operation 720, and if the measured input current value ($I_i$) is less than the predetermined threshold current value ($I_{th}$), the electronic device may perform operation 730.

According to an embodiment, the predetermined threshold current value ($I_{th}$) may be configured to be equal to or more than the maximum value ($I_{max}$) of a proper current range for transmitting the wireless power to the external electronic device 450.

If the measured input current value ($I_i$) is equal to or more than a predetermined threshold current value ($I_{th}$) for more than a selected time during operation 710, in operation 720, for example, the electronic device may adjust the measured input current value ($I_i$) to be reduced to a predetermined current value ($I_{control}$) equal to or less than the predetermined threshold current value ($I_{th}$).

If the measured input current value ($I_i$) is not equal to or more than a predetermined threshold current value ($I_{th}$) for more than a selected time during operation 710, in operation 730, for example, the electronic device may control to maintain the measured input current value ($I_i$).

Meanwhile, operation 710 to operation 730 may be repeated under the control of the electronic device periodically or aperiodically. In addition, operation 710 to operation 730 may be terminated at any time under the control of the electronic device.

Figure 8:
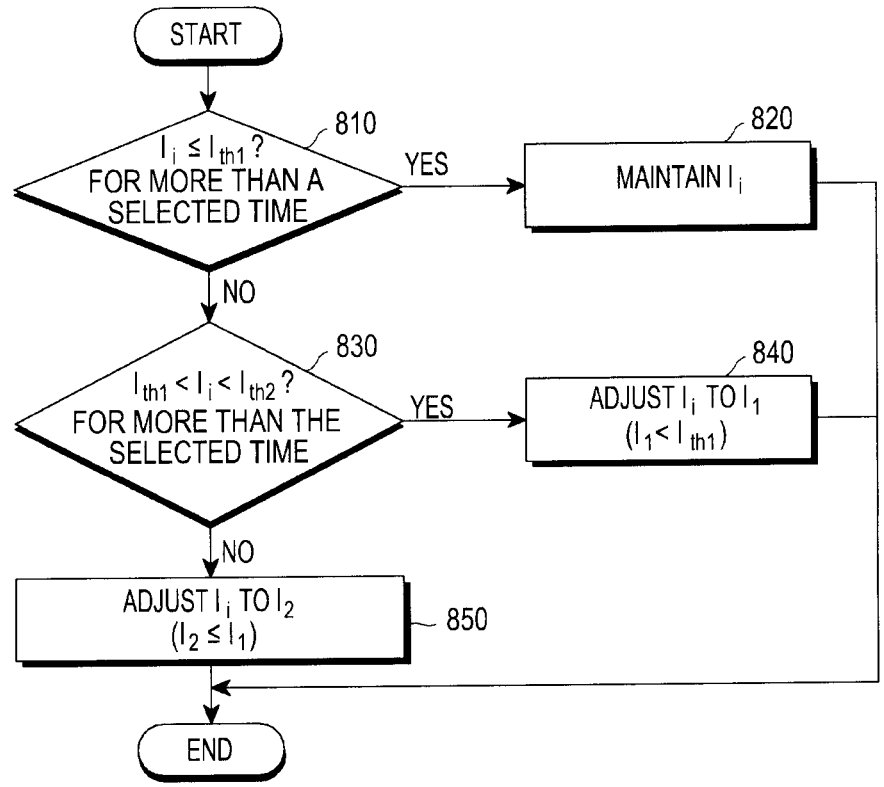
FIG. 8 is a flowchart showing a temperature control method of an electronic device, according to an embodiment of the present disclosure.

FIG. 8 is a flowchart showing a temperature control method in the electronic device, according to an embodiment of the present disclosure. FIG. 8 is a detailed flowchart showing the input current control operation (e.g., element 530 of FIG. 5) according to the temperature control method in the electronic device shown in FIG. 5, and the input current control operation 530 of the electronic device may include operation 810 to operation 850. The temperature control method of the electronic device may be performed by at least one of the electronic device 400, the processor of the electronic device (e.g., the processors 120 and 210 of the electronic devices 101 and 201), or the controller (e.g., the controller 412) of the electronic device.

In operation 810, for example, the electronic device may determine whether or not the measured input current value ($I_i$) is equal to or less than the first predetermined threshold current value ($I_{th1}$) for more than a selected time. If the measured input current value ($I_i$) is equal to or less than the first predetermined threshold current value ($I_{th1}$) for more than the selected time, the electronic device may perform operation 820, and if the measured input current value ($I_i$) exceeds the first predetermined threshold current value ($I_{th1}$), the electronic device may perform operation 830.

According to an embodiment, the first predetermined threshold current value ($I_{th1}$) may be configured to be equal to or more than the maximum value ($I_{max}$) of the proper current range for transmitting the wireless power to the external electronic device 450.

If the measured input current value ($I_i$) is equal to or less than the first predetermined threshold current value ($I_{th1}$) for more than a selected time, during operation 810 in operation 820, for example, the electronic device may control to maintain the measured input current value ($I_i$).

If the measured input current value ($I_i$) is not equal to or less than the first predetermined threshold current value ($I_{th1}$) for more than a selected time, during operation 810 in operation 830, for example, the electronic device may determine whether or not the measured input current value ($I_i$) is more than the first predetermined threshold current value ($I_{th1}$) and is less than the second predetermined threshold current value ($I_{th2}$) for more than the selected time. If the measured input current value ($I_i$) is more than the first predetermined threshold current value ($I_{th1}$) and is less than the second predetermined threshold current value ($I_{th2}$), the electronic device may perform operation 840. Otherwise, the electronic device may determine that the measured input current value ($I_i$) is equal to or more than the second predetermined threshold current value ($I_{th2}$), and may perform operation 850.

According to an embodiment, the second predetermined threshold current value ($I_{th2}$) may be configured to be more than the first predetermined threshold current value ($I_{th1}$).

If the measured input current value ($I_i$) is more than the first predetermined threshold current value ($I_{th1}$) and is less than the second predetermined threshold current value ($I_{th2}$) for more than the selected time, during operation 830, in operation 840, for example, the electronic device may adjust the measured input current value ($I_i$) to be reduced to the first predetermined current value ($I_1$) that is less than the first predetermined threshold current value ($I_{th1}$).

If the measured input current value ($I_i$) is not more than the first predetermined threshold current value ($I_{th1}$) and is less than the second predetermined threshold current value ($I_{th2}$) for more than the selected time during operation 830, in operation 850, for example, the electronic device may adjust the measured input current value ($I_i$) to be reduced to the second predetermined current value ($I_2$) that is equal to or less than the first current value ($I_1$).

According to an embodiment, the second current value ($I_2$) may be configured to be equal to or more than the minimum charge current value ($I_{min}$) for transmitting the wireless power to the electronic device 450.

Meanwhile, operation 810 to operation 850 may be repeated under the control of the electronic device periodically or aperiodically. In addition, operation 810 to operation 850 may be terminated at any time under the control of the electronic device.

Figure 9:
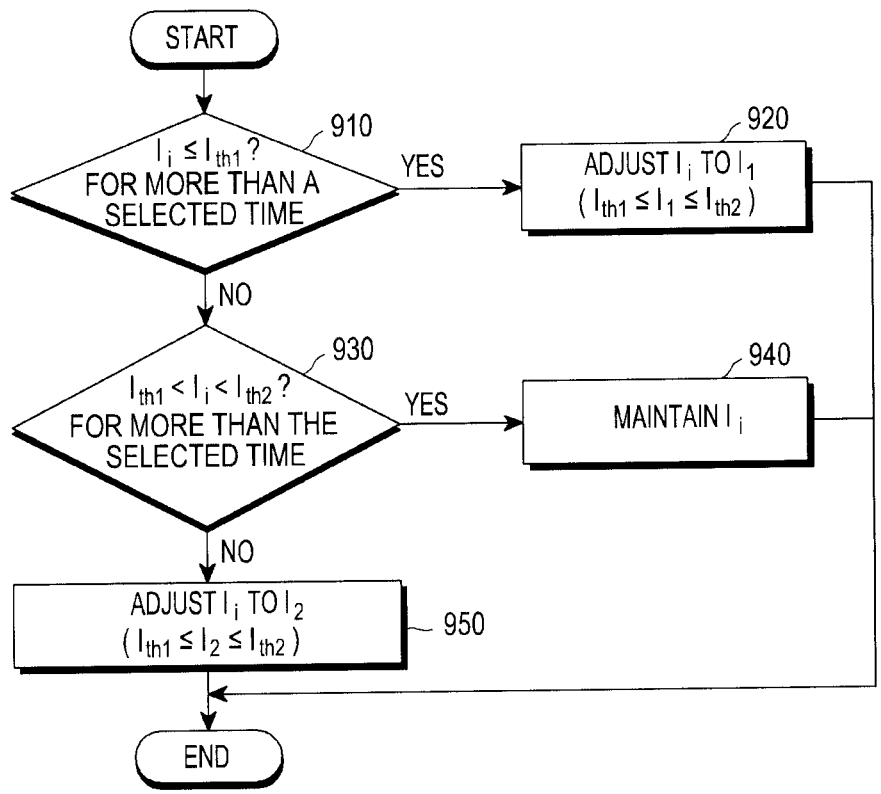
FIG. 9 is a flowchart showing a temperature control method of an electronic device, according to various embodiments.

FIG. 9 is a flowchart showing a temperature control method in the electronic device, according to various embodiments of the present disclosure. FIG. 9 is a detailed flowchart showing the input current control operation (e.g., FIG. 5, 530) according to the temperature control method in the electronic device shown in FIG. 5, and the input current control operation 530 of the electronic device may include operation 910 to operation 950. The temperature control method of the electronic device, according to various embodiments of the present disclosure, may be performed by at least one of the electronic device 400, the processor of the electronic device (e.g., the processors 120 and 210 of the electronic devices 101 and 201), or the controller (e.g., the controller 412) of the electronic device.

In operation 910, for example, the electronic device may determine whether or not the measured input current value ($I_i$) is equal to or less than the first predetermined threshold current value ($I_{th1}$) for more than the selected time. If the measured input current value ($I_i$) is equal to or less than the first predetermined threshold current value ($I_{th1}$), the electronic device may perform operation 920, and if the measured input current value ($I_i$) exceeds the first predetermined threshold current value ($I_{th1}$), the electronic device may perform operation 930.

According to an embodiment, the first predetermined threshold current value ($I_{th1}$) may be configured to be equal to or less than the minimum value ($I_{min}$) of the proper current range for transmitting the wireless power to the external electronic device 450, and the second predetermined threshold current value ($I_{th2}$) may be configured to be equal to or more than the maximum value ($I_{max}$) thereof.

If the measured input current value ($I_i$) is equal to or less than the first predetermined threshold current value ($I_{th1}$) for more than the selected time, during operation 910, in operation 920, for example, the electronic device may adjust the measured input current value ($I_i$) to be increased to the first predetermined current value ($I_1$), which is equal to or more than the first threshold current value ($I_{th1}$) and is equal to or less than the second threshold current value ($I_{th2}$).

If the measured input current value ($I_i$) is not equal to or less than the first predetermined threshold current value ($I_{th1}$) for more than the selected time, during operation 910, in operation 930, for example, the electronic device may determine whether or not the measured input current value ($I_i$) is more than the first predetermined threshold current value ($I_{th1}$) and is less than the second predetermined threshold current value ($I_{th2}$) for more than the selected time. If the measured input current value ($I_i$) is more than the first predetermined threshold current value ($I_{th1}$) and is less than the second predetermined threshold current value ($I_{th2}$), the electronic device may perform operation 940. Otherwise, the electronic device may determine that the measured input current value ($I_i$) is equal to or more than the second predetermined threshold current value ($I_{th2}$), and may perform operation 950.

If the measured input current value ($I_i$) is more than the first predetermined threshold current value ($I_{th1}$) and is less than the second predetermined threshold current value ($I_{th2}$), in operation 940, for example, the electronic device may control to maintain the measured input current value ($I_i$).

If the measured input current value ($I_i$) is not more than the first predetermined threshold current value ($I_{th1}$) and is less than the second predetermined threshold current value ($I_{th2}$), in operation 950, for example, the electronic device may adjust the measured input current value ($I_i$) to be reduced to the second predetermined current value ($I_2$), which is equal to or more than the first threshold current value ($I_{th1}$) and is equal to or less than the second threshold current value ($I_{th2}$).

Meanwhile, operation 910 to operation 950 may be repeated under the control of the electronic device periodically or aperiodically. In addition, operation 910 to operation 950 may be terminated at any time under the control of the electronic device.

Figure 10:
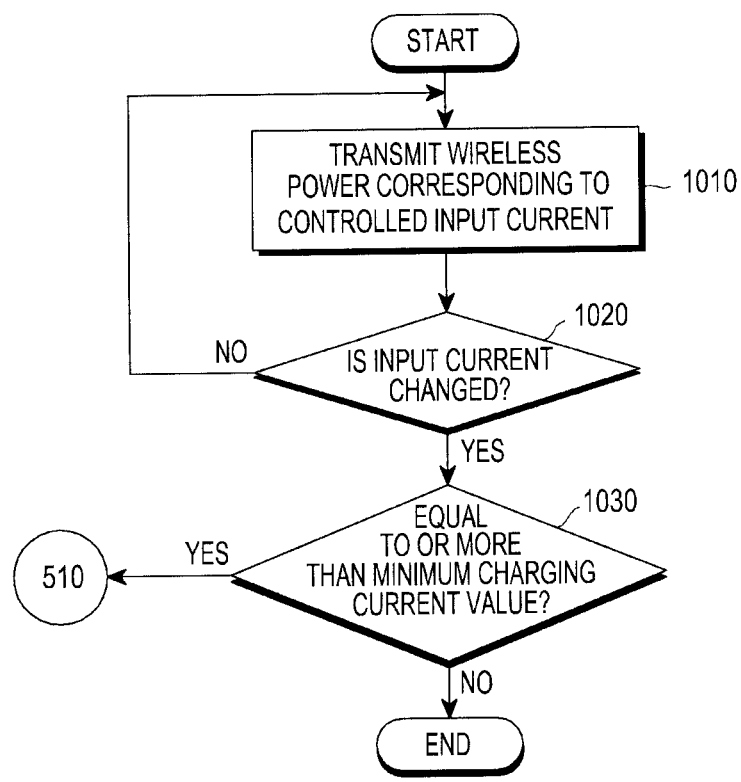
FIG. 10 is a flowchart showing a temperature control method of an electronic device, according to an embodiment of the present disclosure.

FIG. 10 is a flowchart showing a temperature control method in the electronic device, according to an embodiment of the present disclosure.

FIG. 10 further includes the operation following the operation of the temperature control method of the electronic device in FIG. 5, and the temperature control method of the electronic device may include operation 1010 to operation 1030. The temperature control method of the electronic device, according to various embodiments of the present disclosure, may be performed by at least one of the electronic device 400, the processor of the electronic device (e.g., the processors 120 and 210 of the electronic devices 101 and 201), or the controller (e.g., the controller 412) of the electronic device.

In operation 1010, for example, the electronic device 400 may transmit, to the external electronic device 450, the wireless power that is generated to correspond to the controlled input current.

According to an embodiment, when the input current, which is controlled according to operation 510 to operation 530 of FIG. 5, is applied to the loop coil 411L made of a conductive pattern in the power transmission circuit 411, the electronic device may transmit the wireless power corresponding to the controlled input current to the loop coil 451L of the nearby external electronic device 450, which is made of a conductive pattern. The external electronic device 450 may supply the wireless power received in the loop coil 451L to the load circuit 451d through the receiving circuit (e.g., the rectifier 451a, the DC/DC converter 451b, and the switching circuit 451c).

In operation 1020, for example, the electronic device 400 may determine whether or not the input current value ($I_i$) applied to the loop coil 411L of the power transmission circuit 411 is changed while transmitting the wireless power. For example, the sensing circuit 414 of the electronic device may measure the input current value ($I_i$) or the temperature in a specific period in order to thereby determine whether or not the input current value ($I_i$) is changed. For another example, when the communication circuit 413 of the electronic device 400 receives a wireless power transmission request from the external electronic device 450, the electronic device may determine whether or not the input current value ($I_i$) is changed. If the input current value ($I_i$) is changed, the electronic device may perform operation 1030. Otherwise, the electronic device may repeat operation 1010.

For example, if the input current value ($I_i$) is changed, the electronic device 400 may determine whether or not the changed input current ($I_{changed}$) is equal to or more than the predetermined minimum charging current value ($I_{min}$) for transmitting the wireless power to the external electronic device 450 in operation 1030. If the changed input current a ($I_{changed}$) is equal to or more than the predetermined minimum charging current value ($I_{min}$), the electronic device 400 may return to operation 510 of FIG. 5, and may repeat the subsequent operations in order to thereby control the input current value ($I_i$) that is applied to the loop coil 411L according to the changed input current ($I_{changed}$). If the changed input current ($I_{changed}$) is less than the predetermined minimum charging current value ($I_{min}$), the electronic device 400 may determine that the external electronic device 450 is not in a normal position on the electronic device for charging, and may stop the wireless power transmission to end the wireless charging.

According to an embodiment, the minimum charging current value ($I_{min}$) may be configured to be the minimum current value, which is required for the electronic device 400 to transmit the wireless power to the external electronic device 450.

Figure 11:
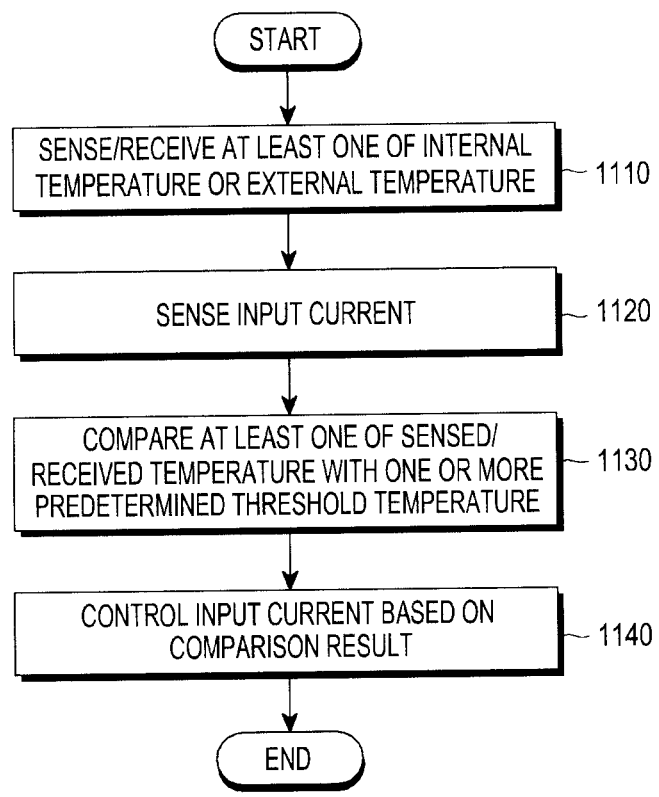
FIG. 11 is a flowchart showing a temperature control method of an electronic device, according to an embodiment of the present disclosure.

FIG. 11 is a flowchart showing a temperature control method in the electronic device 400, according to an embodiment of the present disclosure. The temperature control method of the electronic device may include operation 1110 to operation 1140. The temperature control method of the electronic device 400 may be performed by at least one of the electronic device 400, the processor of the electronic device 400 (e.g., the processors 120 and 210 of the electronic devices 101 and 201), or the controller (e.g., the controller 412) of the electronic device 400.

In operation 1110, for example, the electronic device may sense at least one of an internal temperature or an external temperature of the electronic device 400 through the sensing circuit 414 (e.g., the input/output interface 150, and the sensor module 240), or may receive at least one of an internal temperature or an external temperature of the external electronic device 450, which is sensed by the sensing circuit 454 of the external electronic device 450. According to an embodiment, the sensing circuits 414 and 454 may include temperature sensors. According to an embodiment, the sensing circuits 414 and 454 may include current/voltage sensors.

In operation 1120, for example, when at least one of the internal temperature or the external temperature of the electronic device 400 is sensed through the sensing circuit 414 or at least one of the internal temperature or the external temperature of the external electronic device 450 is received from the external electronic device 450 through the communication circuit 413, the electronic device 400 may measure the input current value ($I_i$) that is applied to the loop coil 411L in the power transmission circuit 411 through the sensing circuit 414.

In operation 1130, for example, the electronic device 400 may compare the measured or received temperature value with one or more predetermined threshold temperature values.

In an embodiment, the sensed or received temperature value may include at least one of the internal or external temperature value of the electronic device 400, or the internal or external temperature value of the external electronic device 450.

In operation 1140, for example, the electronic device may control the input current value ($I_i$) on the basis of the comparison result of the sensed or received temperature value and the one or more predetermined threshold temperature values. Operation 1140 will be described later in more detail with reference to FIG. 12 to FIG. 14 below.

Figure 12:
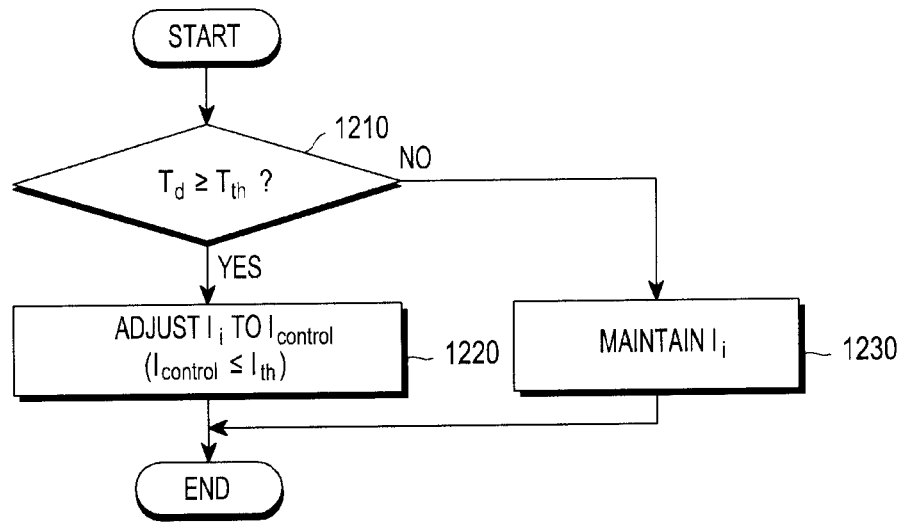
FIG. 12 is a flowchart showing a temperature control method of an electronic device, according to an embodiment of the present disclosure.

FIG. 12 is a flowchart showing a temperature control method of the electronic device. FIG. 12 is a detailed flowchart showing an example of the input current control operation (e.g., FIG. 11, element 1140) according to the temperature control method in the electronic device shown in FIG. 11, and the input current control operation of the electronic device may include operation 1210 to operation 1230. The input current control operation of the electronic device may be performed by at least one of the electronic device 400, the processor of the electronic device (e.g., the processors 120 and 210 of the electronic devices 101 and 201), or the controller (e.g., the controller 412) of the electronic device.

In operation 1210, for example, the electronic device may determine whether or not the sensed or received temperature value ($T_d$) is equal to or more than the predetermined threshold temperature value ($T_{th}$). If the sensed or received temperature value ($T_d$) is equal to or more than the predetermined threshold temperature value ($T_{th}$), the electronic device may perform operation 1220, and if the sensed or received temperature value ($T_d$) is less than the predetermined threshold temperature value ($T_{th}$), the electronic device may perform operation 1230.

According to an embodiment, the predetermined threshold temperature value ($T_{th}$) may be configured to be equal to or more than the maximum charging temperature value ($T_{max}$) corresponding to the maximum value ($I_{max}$) of the proper current range for transmitting the wireless power to the external electronic device 450.

If the sensed or received temperature value ($T_d$) is equal to or more than the predetermined threshold temperature value ($T_{th}$), in operation 1220, for example, the electronic device may adjust the input current value ($I_i$) to a predetermined current value ($I_{control}$) equal to or less than the predetermined threshold current value ($I_{th}$).

According to an embodiment, the predetermined threshold current value ($I_{th}$) may be configured to be equal to or more than a maximum value ($I_{max}$) in a proper current range for transmitting the wireless power to the external electronic device 450.

If the sensed or received temperature value ($T_d$) is not equal to or more than the predetermined threshold temperature value ($T_{th}$), in operation 1230, for example, the electronic device controls to maintain the input current value ($I_i$).

Meanwhile, operation 1210 to operation 1230 may be repeated under the control of the electronic device periodically or aperiodically. In addition, operation 1210 to operation 1230 may be terminated at any time under the control of the electronic device.

Figure 13:
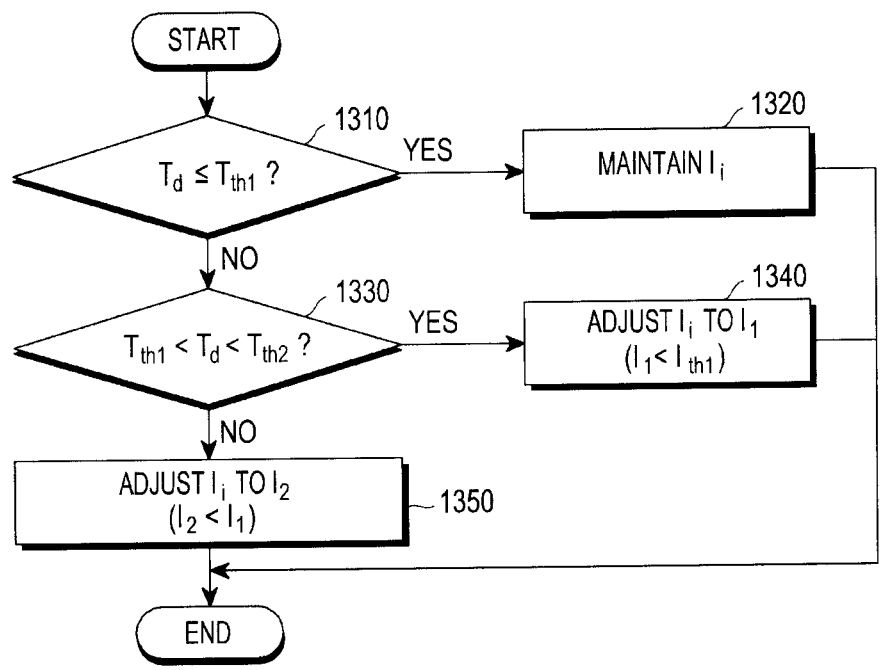
FIG. 13 is a flowchart showing a temperature control method of an electronic device, according to various embodiments.

FIG. 13 is a flowchart showing a temperature control method of the electronic device, according to various embodiments of the present disclosure. FIG. 13 is a detailed flowchart showing an example of the input current control operation (e.g., FIG. 11, element 1140) according to the temperature control method in the electronic device shown in FIG. 11, and the input current control operation of the electronic device may include operation 1310 to operation 1350. The input current control operation of the electronic device may be performed by at least one of the electronic device 400, the processor of the electronic device (e.g., the processors 120 and 210 of the electronic devices 101 and 201), or the controller (e.g., the controller 412) of the electronic device.

In operation 1310, for example, the electronic device may determine whether or not the sensed or received temperature value ($T_d$) is equal to or less than the first predetermined threshold temperature value ($T_{th1}$). If the sensed or received temperature value ($T_d$) is equal to or less than the first predetermined threshold temperature value ($T_{th1}$), the electronic device may perform operation 1320, and if the sensed or received temperature value ($T_d$) exceeds the first predetermined threshold temperature value ($T_{th1}$), the electronic device may perform operation 1330.

According to an embodiment, the first predetermined threshold temperature value ($T_{th1}$) may be configured to be equal to or more than the maximum temperature value ($T_{max}$) corresponding to the maximum value ($I_{max}$) of the proper current range for transmitting the wireless power to the external electronic device 450.

If the sensed or received temperature value ($T_d$) is equal to or less than the first predetermined threshold temperature value ($T_{th1}$), in operation 1320, for example, the electronic device controls to maintain the measured input current value ($I_i$).

If the sensed or received temperature value ($T_d$) is not equal to or less than the first predetermined threshold temperature value ($T_{th1}$), in operation 1330, for example, the electronic device may determine whether or not the sensed or received temperature value ($T_d$) is more than the first predetermined threshold temperature value ($T_{th1}$) and is less than the second predetermined threshold current value ($T_{th2}$). If the sensed or received temperature value ($T_d$) is more than the first predetermined threshold temperature value ($T_{th1}$) and is less than the second predetermined threshold current value ($T_{th2}$), the electronic device may perform operation 1340. Otherwise, the electronic device may determine that the sensed or received temperature value ($T_d$) is equal to or more than the second predetermined threshold current value ($T_{th2}$), and may perform operation 1350.

According to an embodiment, the second predetermined threshold temperature value ($T_{th2}$) may be configured to be more than the first predetermined threshold temperature value ($T_{th1}$).

In operation 1340, for example, the electronic device may adjust the measured input current value ($I_i$) to the first predetermined current value ($I_1$) less than the first predetermined threshold current value ($I_{th1}$).

According to an embodiment, the first predetermined threshold current value ($I_{th1}$) may be configured to be equal to or less than the maximum value ($I_{min}$) of the proper current range for transmitting the wireless power to the external electronic device 450.

In operation 1350, for example, the electronic device may adjust the measured input current value ($I_i$) to the second current value ($I_2$) equal to or less than the first current value ($I_1$).

According to an embodiment, the second current value ($I_2$) may be configured to be equal to or more than the maximum charging current value ($I_{min}$) for transmitting the wireless power to the external electronic device 450.

Meanwhile, operation 1310 to operation 1350 may be repeated under the control of the electronic device periodically or aperiodically. In addition, operation 1310 to operation 1350 may be terminated at any time under the control of the electronic device.

Figure 14:
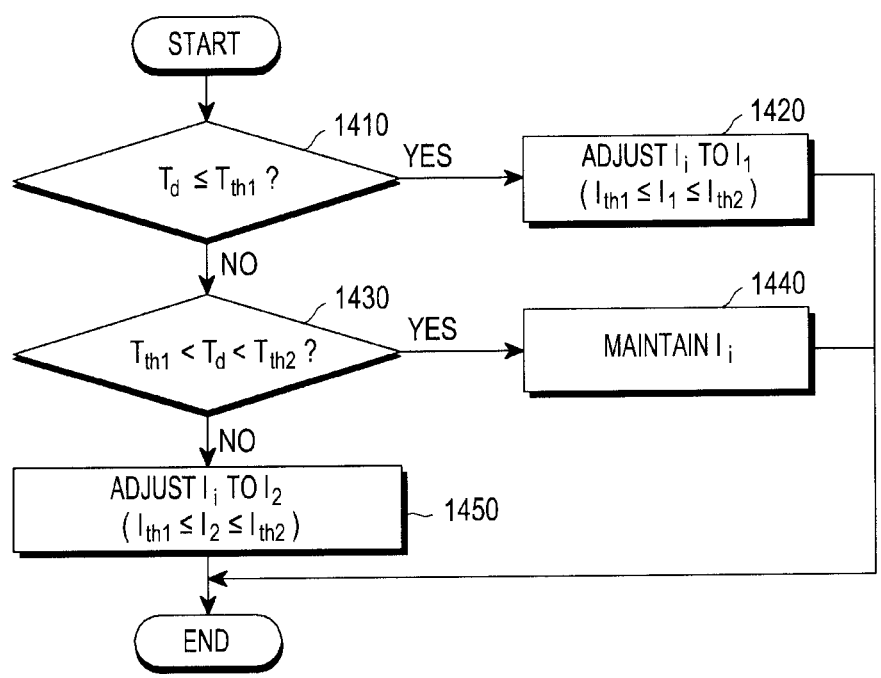
FIG. 14 is a flowchart showing a temperature control method of an electronic device, according to various embodiments.

FIG. 14 is a flowchart showing a temperature control method of the electronic device, according to various embodiments. FIG. 14 is a detailed flowchart showing an example of the input current control operation (e.g., FIG. 11, element 1140) according to the temperature control method in the electronic device shown in FIG. 11, and the input current control operation of the electronic device may include operation 1410 to operation 1450. The input current control operation of the electronic device may be performed by at least one of the electronic device 400, the processor of the electronic device (e.g., the processors 120 and 210 of the electronic devices 101 and 201), or the controller (e.g., the controller 412) of the electronic device.

In operation 1410, for example, the electronic device may determine whether or not the sensed or received temperature value ($T_d$) is equal to or less than the first predetermined threshold temperature value ($T_{th1}$). If the sensed or received temperature value ($T_d$) is equal to or less than the first predetermined threshold temperature value ($T_{th1}$), the electronic device may perform operation 1420, and if the sensed or received temperature value ($T_d$) exceeds the first predetermined threshold temperature value ($T_{th1}$), the electronic device may perform operation 1430.

According to an embodiment, the first predetermined threshold temperature value ($T_{th1}$) may be configured to be equal to or more than the minimum temperature value ($T_{min}$) corresponding to the minimum charging current value ($I_{min}$) that is required to transmit the wireless power to the external electronic device 450.

If the sensed or received temperature value ($T_d$) is equal to or less than the first predetermined threshold temperature value ($T_{th1}$) during operation 1410, in operation 1420, for example, the electronic device may adjust the measured input current value ($I_i$) to be increased to the first predetermined current value ($I_1$), which is equal to or more than the first predetermined threshold current value ($I_{th1}$) and is equal to or less than the second predetermined threshold current value ($I_{th2}$).

According to an embodiment, the first predetermined threshold current value ($I_{th1}$) may be configured to be equal to or more than the minimum charging current value ($I_{min}$) that is required to transmit the wireless power to the external electronic device 450, and the second predetermined threshold current value ($I_{th2}$) may be configured to be equal to or less than the maximum charging current value ($I_{max}$) that is required to transmit the wireless power to the external electronic device 450.

If the sensed or received temperature value ($T_d$) is not equal to or less than the first predetermined threshold temperature value ($T_{th1}$), in operation 1430, for example, the electronic device may determine whether or not the sensed or received temperature value ($T_d$) is more than the first predetermined threshold temperature value ($T_{th1}$) and is less than the second predetermined threshold current value ($T_{th2}$). If the sensed or received temperature value ($T_d$) is more than the first predetermined threshold temperature value ($T_{th1}$) and is less than the second predetermined threshold current value ($T_{th2}$), the electronic device may perform operation 1440. Otherwise, the electronic device may determine that the sensed or received temperature value ($T_d$) is equal to or more than the second predetermined threshold current value ($T_{th2}$), and may perform operation 1450.

According to an embodiment, the second predetermined threshold temperature value ($T_{th2}$) may be configured to be equal to or more than the maximum temperature value ($T_{max}$) corresponding to the maximum charging current value ($I_{max}$) that is required to transmit the wireless power to the external electronic device 450.

If the sensed or received temperature value ($T_d$) is more than the first predetermined threshold temperature value ($T_{th1}$) and is less than the second predetermined threshold current value ($T_{th2}$) during operation 1430, in operation 1440, for example, the electronic device controls to maintain the measured input current value ($I_i$).

If the sensed or received temperature value ($T_d$) is not more than the first predetermined threshold temperature value ($T_{th1}$) or less than the second predetermined threshold current value ($T_{th2}$), during operation 1410, in operation 1450, for example, the electronic device may adjust the measured input current value ($I_i$) to be reduced to the second current value ($I_2$), which is equal to or more than the first predetermined threshold current value ($I_{th1}$) and is equal to or less than the second predetermined threshold current value ($I_{th2}$).

Meanwhile, operation 1410 to operation 1450 may be repeated under the control of the electronic device periodically or aperiodically. In addition, operation 1410 to operation 1450 may be terminated at any time under the control of the electronic device.

Although the input current value is adjusted based on the measured temperature value in FIG. 12 and FIG. 13, the present disclosure is not limited thereto, and the input current value may be adjusted by using a combination of various methods, such as a method in which the input current value is adjusted based on the measured input current value, as described above.

According to various embodiments, a temperature control method of an electronic device may include: measuring an input current value applied to a conductive pattern provided in the electronic device; and if the measured input current value exceeds one or more predetermined threshold current values, adjusting the input current value to a current value that is equal to or less than one or more predetermined current values.

According to various embodiments, the measuring of the input current value may include: determining whether or not the current applied to the conductive pattern is sensed; when the current is sensed, determining whether or not the sensed current converges on a constant current level; and if the sensed current converges on a constant current level, providing the converged current level as the input current value, which is applied to the conductive pattern.

According to various embodiments, the controlling of the input current value may include, if the measured input current value is equal to or less than a predetermined threshold current value, maintaining the input current value.

According to various embodiments, the controlling of the input current value may include: if the measured input current value is equal to or less than the first predetermined threshold current value, maintaining the input current value; if the measured input current value is more than the first predetermined current value and is less than the second predetermined threshold current value, which is more than the first predetermined threshold current value; adjusting the input current value to the first predetermined current value that is less than the first predetermined current value; and if the measured input current value is equal to or more than the second predetermined threshold current value, adjusting the input current value to the second predetermined current value equal to or less than the first current value.

According to various embodiments, the controlling of the input current value may include: if the measured input current value is equal to or less than the first predetermined threshold current value, adjusting the input current value to the first predetermined current value, which is equal to or more than the first predetermined threshold current value and is equal to or less than the second predetermined threshold current value, which is more than the first predetermined threshold current value; if the measured input current value is more than the first predetermined threshold current value and is less than the second predetermined threshold current value, maintaining the input current value; and if the measured input current value is equal to or more than the second predetermined threshold current value, adjusting the input current value to the second predetermined current value, which is equal to or more than the first predetermined threshold current value and is equal to or less than the second predetermined threshold current value.

According to various embodiments, the method may further include transmitting the wireless power corresponding to the controlled input current value to the external electronic device.

According to various embodiments, the method may further include, if the measured input current value is changed after transmitting the wireless power, determining whether or not the wireless power is to be transmitted, based on the comparison result of the changed input current value and a predetermined minimum charging current value.

According to various embodiments, the determining of the wireless power transmission may include: if the changed input current value is equal to or more than the minimum charging current value, determining to transmit the wireless power corresponding to the input current value that is controlled according to the changed input current value; and if the changed input current value is less than the minimum charging current value, determining to stop the wireless power transmission.

According to various embodiments, the method may further include: sensing at least one of an internal temperature or an external temperature of the electronic device; sensing an input current value, which is applied to the electronic device when sensing at least one of the internal temperature or the external temperature; and controlling the input current value based on the comparison result of at least one of the sensed internal temperature or external temperature and one or more predetermined threshold temperatures.

According to various embodiments, the controlling of the input current value may include: if the sensed temperature is equal to or less than a predetermined threshold temperature, maintaining the measured input current value; and if the sensed temperature exceeds the predetermined threshold temperature, adjusting the input current value to a predetermined current value less than the predetermined threshold current value.

According to various embodiments, the method may further include: receiving data related to at least one of an internal temperature or an external temperature of an external electronic device; sensing an input current value of the electronic device when receiving the data; and controlling the input current value based on the received data.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments, a recording medium may record commands that are executed by one or more processors to perform the operations of: measuring an input current value, which is applied to a conductive pattern provided in the electronic device; and if the measured input current value exceeds one or more predetermined threshold current values, adjusting the input current value to a current value equal to or less than one or more predetermined current values.

Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

What is claimed is:

1. An electronic device comprising:
a housing;
a conductive pattern that is provided in the housing; and
a controller that is electrically connected with the conductive pattern, configured to apply a current to the conductive pattern, monitor the current, and if the monitored current value exceeds a first threshold value for more than a selected time, change the current value to a first selected value that is equal to or less than the first threshold value and if the monitored current value is greater than a second threshold value exceeding the first threshold value for more than a selected time, changes the current value to a second selected value that is equal to or less than the second threshold value;
wherein the conductive pattern is configured to generate induced electric power responsive to application of current by the controller.

2. The electronic device of claim 1, wherein the controller, if the monitored current value is between the first threshold value and the second threshold value for more than a selected time, maintains the current value.

3. The electronic device of claim 1, wherein the controller controls to change the current value to a selected value that is equal to or less than the first threshold value, based on at least one of an internal temperature of the electronic device, an external temperature of the external device, or an ambient temperature of the electronic device or an external device, which is measured through a sensor that is electrically connected with the electronic device or the external device.

4. An electronic device comprising:
a housing;
a conductive pattern that is provided in the housing;
a sensing circuit that measures an input current value applied to the conductive pattern;
a communication circuit that wirelessly communicates information with an external electronic device; and
a controller that, if the measured input current value exceeds one or more predetermined threshold current values, controls to adjust the input current value to be equal to or less than the one or more predetermined current values, and transmit wireless power corresponding to the controlled input current value to the external electronic device.

5. The electronic device of claim 4, wherein the controller controls the sensing circuit to:
determine whether or not the current applied to the conductive pattern is sensed;
if the current is sensed, determine whether or not the sensed current converges on a constant current level; and
if the sensed current converges on the constant current level, provide the converged current level as the input current value.

6. The electronic device of claim 4, wherein the controller, if the measured input current value is equal to or less than the one or more predetermined threshold current values, maintains the input current value.

7. The electronic device of claim 4, wherein the controller:
if the measured input current value is equal to or less than a first predetermined threshold current value, maintains the input current value;
if the measured input current value is more than the first predetermined threshold current value and is less than a second predetermined threshold current value, which is more than the first predetermined threshold current value, adjusts the input current value to a first predetermined current value that is less than the first threshold current value; and
if the measured input current value is equal to or more than the second predetermined threshold current value, adjusts the input current value to a second predetermined current value that is equal to or less than the first current value.

8. The electronic device of claim 4, wherein the controller:
if the measured input current value is equal to or less than a first predetermined threshold current value, adjusts the input current value to a first predetermined current value, which is equal to or more than the first predetermined threshold current value and is equal to or less than a second predetermined threshold current value, which is more than the first predetermined threshold current value;
if the measured input current value is more than the first predetermined threshold current value and is less than a second predetermined threshold current value, maintains the input current value; and
if the measured input current value is equal to or more than the second predetermined threshold current value, adjusts the input current value to the second predetermined current value, which is equal to or more than the first predetermined threshold current value and is equal to or less than the second predetermined threshold current value.

9. The electronic device of claim 4, wherein the controller further controls to transmit wireless power corresponding to the controlled input current value to an external electronic device.

10. The electronic device of claim 9, wherein the controller, if the measured input current value is changed after transmitting the wireless power, controls to determine whether or not the wireless power is to be transmitted, based on a comparison result of the changed input current value and a predetermined minimum charging current value.

11. The electronic device of claim 10, wherein the controller:
if the changed input current value is equal to or more than the minimum charging current value, determines to transmit the wireless power corresponding to the input current value that is controlled according to the changed input current value; and
if the changed input current value is less than the minimum charging current value, determines to stop wireless power transmission.

12. The electronic device of claim 4, wherein the controller:
senses at least one of an internal temperature or an external temperature of the electronic device through the sensing circuit;
compares at least one of the sensed internal temperature or external temperature with one or more predetermined threshold temperatures; and
controls the input current value based on a comparison result.

13. The electronic device of claim 12, wherein the controller:
if the sensed temperature is equal to or less than a predetermined threshold temperature, maintains the measured input current value; and
if the sensed temperature exceeds the predetermined threshold temperature, adjusts the input current value to a current value that is less than the predetermined threshold current value.

14. The electronic device of claim 4, wherein the controller receives data related to at least one of an internal temperature or an external temperature of an external electronic device through the communication circuit, and controls the input current value based on received data.

15. A temperature control method of an electronic device, the method comprising:
measuring an input current value that is applied to a conductive pattern provided in the electronic device; and
when the measured input current value exceeds one or more predetermined threshold current values, adjusting the input current value to a current value that is equal to or less than the one or more predetermined current values, wherein:
when the measured input current value is equal to or less than a first predetermined threshold current value, the electronic device maintains the input current value;
when the measured input current value is more than the first predetermined threshold current value and is less than a second predetermined threshold current value, which is more than the first predetermined threshold current value, the electronic device adjusts the input current value to a first predetermined current value that is less than the first threshold current value; and when the measured input current value is equal to or more than the second predetermined threshold current value, the electronic device adjusts the input current value to a second predetermined current value that is equal to or less than the first current value.

16. The method of claim 15, wherein the measuring of the input current value comprises:

determining whether or not the current applied to the conductive pattern is sensed;

when the current is sensed, determining whether or not the sensed current converges on a constant current level; and if the sensed current converges on a constant current level, providing the converged current level as the input current value applied to the conductive pattern.

17. The method of claim 15, wherein the controlling of the input current value comprises, if the measured input current value is equal to or less than a predetermined threshold current value, maintaining the input current value.

18. The method of claim 15, wherein the controlling of the input current value comprises:

if the measured input current value is equal to or less than a first predetermined threshold current value, adjusting the input current value to a first predetermined current value, which is equal to or more than the first predetermined threshold current value and is equal to or less than a second predetermined threshold current value, which is more than the first predetermined threshold current value;

if the measured input current value is more than the first predetermined threshold current value and is less than the second predetermined threshold current value, maintaining the input current value; and if the input current value is equal to or more than the second predetermined threshold current value, adjusting the input current value to a second predetermined current value, which is equal to or more than the first predetermined threshold current value and is equal to or less than the second predetermined threshold current value.

* * * * *